(12) United States Patent
Okugawa et al.

(10) Patent No.: US 6,600,504 B2
(45) Date of Patent: Jul. 29, 2003

(54) IMAGE FORMING APPARATUS HAVING LIGHT BEAM ADJUSTING MECHANISM

(75) Inventors: Yuji Okugawa, Hachioji (JP); Naoki Tajima, Hachioji (JP); Masaaki Ikeda, Hachioji (JP); Masahiro Shigetomi, Hachioji (JP)

(73) Assignee: Konica Corporation (JP)

( * ) Notice: Subject to any disclaimer, the term of this patent is extended or adjusted under 35 U.S.C. 154(b) by 22 days.

(21) Appl. No.: 09/948,322

(22) Filed: Sep. 7, 2001

(65) Prior Publication Data
US 2002/0030725 A1 Mar. 14, 2002

(30) Foreign Application Priority Data
Sep. 11, 2000 (JP) ........................................ 2000-274655

(51) Int. Cl.[7] .............................. B41J 2/41; B41J 2/435; G03G 15/00; G03G 15/041
(52) U.S. Cl. ...................... 347/152; 347/257; 347/263; 399/126; 399/200; 399/201; 399/202
(58) Field of Search ................................. 347/116, 129, 347/138, 152, 257, 263, 242; 399/51, 126, 200, 201, 202

(56) References Cited

U.S. PATENT DOCUMENTS

| | | | | |
|---|---|---|---|---|
| 4,295,736 A | * | 10/1981 | Ikeda | 399/202 |
| 4,847,642 A | * | 7/1989 | Murayama et al. | 347/116 |
| 5,117,256 A | * | 5/1992 | Haibara | 399/202 |
| 5,214,441 A | * | 5/1993 | Blanding et al. | 347/257 |
| 5,237,348 A | * | 8/1993 | Blanding et al. | 347/138 |
| 5,255,115 A | * | 10/1993 | Kikuchi | 347/257 |
| 6,046,759 A | * | 4/2000 | Kim | 347/263 |
| 6,232,991 B1 | | 5/2001 | Appel | |
| 2001/0012049 A1 | | 8/2001 | Tajima et al. | |
| 2001/0052927 A1 | * | 12/2001 | Takase et al. | 347/257 |

FOREIGN PATENT DOCUMENTS

JP 6-18796 * 1/1994

* cited by examiner

Primary Examiner—Susan S. Y. Lee
(74) Attorney, Agent, or Firm—Muserlian, Lucas and Mercanti

(57) ABSTRACT

An image forming apparatus has a photoreceptor having a image carrying surface, an exposing device to imagewise expose the image carrying surface to form a latent image, and a developing device to develop the latent image to form a toner image on the image carrying surface. The exposing device has a light source which emits a light beam, a deflector which deflects the light beam to form a scanning line with the light beam on the image carrying surface, a cylindrical lens between the deflector and the image carrying surface which focuses the light beam on the image carrying surface, and an adjusting mechanism which adjusts an inclination of the scanning line and adjusts variance in magnification of an image on the scanning line.

14 Claims, 26 Drawing Sheets

FIG. 19 (a)
FIG. 19 (b)
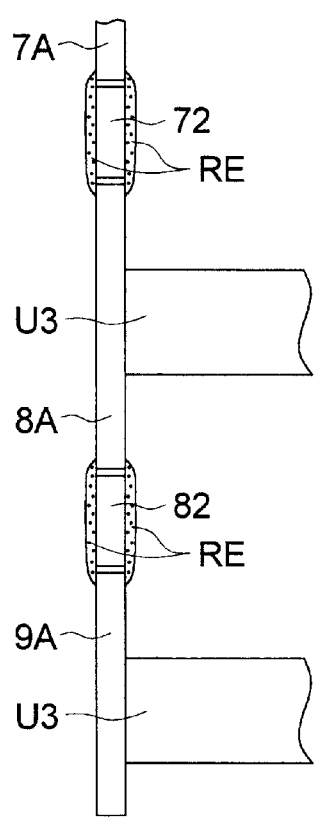
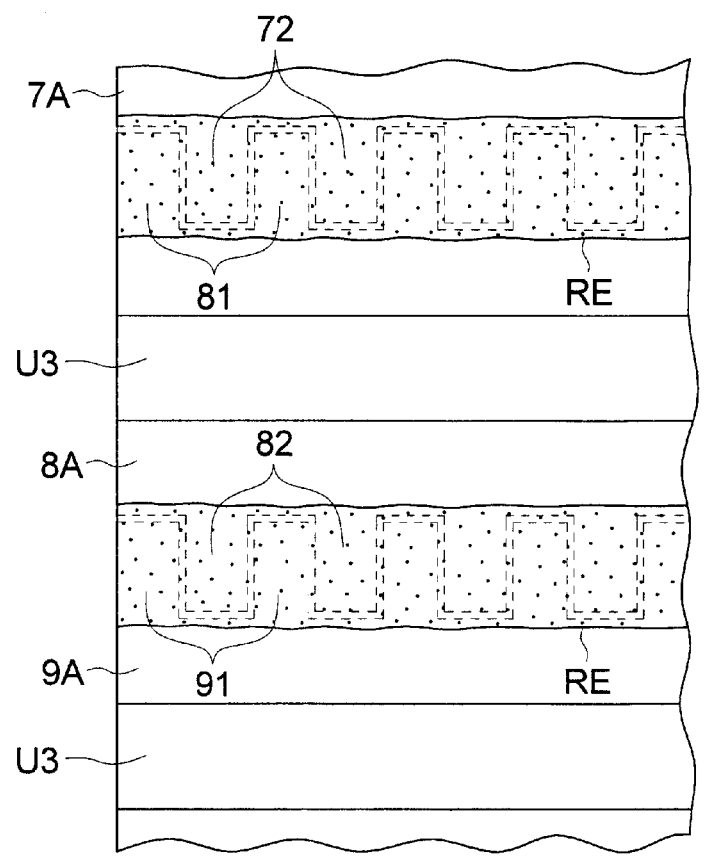

IMAGE FORMING APPARATUS HAVING LIGHT BEAM ADJUSTING MECHANISM

BACKGROUND OF THE INVENTION

The present invention relates to an image forming apparatus for forming an image wherein a photoreceptor is scanned to be exposed to light by a light beam, and to an assembling method of an exposure unit in the image forming apparatus.

In the image forming apparatus for forming an image wherein a photoreceptor is scanned to be exposed to light by a light beam, accuracy of incident position of the light beam on the photoreceptor has an influence on image quality. Therefore, an exposure unit is structured so that the light beam may enter at high accuracy.

In a color image forming apparatus for forming a color image by conducting a plurality of exposures, forming a plurality of images and thereby by superposing the plural images, in particular, it is requested to keep the position stated above accurately.

Typical one that conducts scanning exposure with a light beam is an exposure unit employing a laser, and with respect to adjustment of the position stated above in a laser exposure unit, there is disclosed in U.S. Pat. No. 2,570,176 official gazette, for example, an adjustment mechanism for adjusting a position and an angle of the exposure unit having a laser light source and a scanning exposure optical system in X, Y and Z directions. This adjustment mechanism adjusts at two points representing both ends of each side of the square exposure unit for each of X, Y and Z directions, and thereby adjusts the incident position of the light beam on the photoreceptor.

Each of many color image forming apparatuses is equipped with a plurality of exposure units which form a plurality of color images, and these exposure units are provided in the image forming apparatus at high positional accuracy. In particular, it is required that relative positional accuracy between the exposure units is high. If the positional accuracy between the exposure units is not satisfactory, displacement is caused between color images to cause doubling, resulting in deterioration of image quality. The positional relationship between exposure units needs to be maintained during the operation period of the image forming apparatus.

To satisfy the conditions about positions of the exposure units, a plurality of exposure units have been combined with UV adhesive agents, for example.

In the adjustment mechanism disclosed in the aforesaid patent publication, there are provided 6 adjustment means in total, because adjustment is made at two points for each of X, Y and Z directions. Therefore, the adjustment is complicated. Further, there has not been disclosed a concrete adjustment mechanism capable of attaining simple structure and high adjustment accuracy, in the prior art.

Further, in the fixing means to fix between exposure units by adhesive agents, a great many hours are needed for securing desired strength, which has been a problem in manufacture.

An object of the invention is to solve the aforesaid problems in conventional image forming apparatuses employing a light beam.

SUMMARY OF THE INVENTION

In order to attain the above-described objects, the structure of this invention has been made as follows:

An image forming apparatus, comprising:
a photoreceptor having an image carrying surface;
an exposing device to imagewise expose the image carrying surface to form a latent image; and
a developing device to develop the latent image to form a toner image on the image carrying surface;
the exposing device comprising:
  a light source to emit a light beam;
  a deflector to deflect the light beam so as to form a scanning line with the light beam on the image carrying surface;
  a cylindrical lens provided between the deflector and the image carrying surface and to focus the light beam on the image carrying surface; and
  an adjusting mechanism to adjust an inclination of the scanning line and to adjust variance in magnification of an image on the scanning line.

Further the above objects may be attained by the following structures.
(Structure 1)

An image forming apparatus having therein exposure units each being provided with a laser light source and a scanning optical system that deflects light coming from the light source and emits scanning light beam, the exposure units being supported on at least a first supporting point, a second supporting point and a third supporting point, wherein a first adjustment means that adjusts an inclination of the scanning light beam in the primary scanning direction is provided in a first supporting section where the first supporting point is provided, and the inclination in the primary scanning direction is adjusted only by adjustment of the first adjustment means.
(Structure 2)

An image forming apparatus having therein exposure units each being provided with a laser light source and a scanning optical system that deflects light coming from the light source and emits scanning light beam, the exposure units being supported on at least a first supporting point, a second supporting point and a third supporting point, wherein a second adjustment means that adjusts variation in magnification of the scanning light beam in the primary scanning direction is provided in a second supporting section where the second supporting point is provided, and the variation in magnification is adjusted only by adjustment of the second adjustment means.
(Structure 3)

The image forming apparatus according to Structure 1 above having therein exposure units each being provided with a laser light source and a scanning optical system that deflects light coming from the light source and emits scanning light beam, the exposure units being supported on at least a first supporting point, a second supporting point and a third supporting point, wherein a second adjustment means that adjusts variation in magnification of the scanning light beam in the primary scanning direction is provided in a second supporting section where the second supporting point is provided, and the variation in magnification is adjusted only by adjustment of the second adjustment means.
(Structure 4)

An image forming apparatus according to Structure 1 above having therein exposure units each being provided with a laser light source and a scanning optical system that deflects light coming from the light source and emits scanning light beam, the exposure units being supported on at least a first supporting point, a second supporting point and a third supporting point, wherein a first supporting section in which at least one supporting point among three supporting points is provided a spherical body bearing that supports the exposure unit rotatably in all directions.
(Structure 5)

The image forming apparatus according to Structure 1 or Structure 3 above, wherein the first supporting section is provided with a spherical body bearing that supports the exposure unit rotatably in all directions.
(Structure 6)

The image forming apparatus according to Structure 1 or Structure 3 above, wherein a movement of the first supporting point is conducted around a straight line passing through the other two supporting points which serves as the axis, and at least one of the other two supporting points can move in the direction that is mostly perpendicular to the movement direction of the first supporting section.
(Structure 7)

The image forming apparatus according to Structure 2, wherein the second supporting section is provided with a spherical body bearing that supports the exposure unit rotatably in all directions.
(Structure 8)

The image forming apparatus according to Structure 2 or Structure 3 above, wherein a movement of the second supporting point is a rotation around the first supporting point, and the second supporting section is provided with a slide which makes the exposure unit to move in the direction of a normal line for the direction of the aforesaid rotation.
(Structure 9)

The image forming apparatus according to either one of Structure 1–Structure 4 above, wherein the third supporting point is made to be a fixed point.
(Structure 10)

The image forming apparatus according to Structure 9, wherein the third supporting point is provided on the plane that mostly includes an optical axis of the scanning optical system and is mostly perpendicular to the scanning plane.
(Structure 11)

The image forming apparatus according to Structure 9 or Structure 10, wherein the first supporting point and the second supporting point are provided respectively on both end portions of an optical path formed by the scanning optical system.
(Structure 12)

The image forming apparatus according to either one of Structure 9–Structure 11 above, wherein the first supporting point and the second supporting point are provided respectively at positions which are mostly symmetrical about an optical axis of the scanning optical system.
(Structure 13)

The image forming apparatus according to Structure 4 above, wherein the spherical body bearing has a separation preventing member that prevents separation of the supporting spherical body.
(Structure 14)

The image forming apparatus according to Structure 13 above, wherein the separation preventing member is elastic.
(Structure 15)

The image forming apparatus according to Structure 13 or Structure 14 above, wherein the spherical body bearing supports the spherical body at three points thereon, and the separation preventing member makes the spherical body to be in pressure contact with the spherical body bearing by touching at least one point on the spherical body.
(Structure 16)

The image forming apparatus according to Structure 13 or Structure 14 above, wherein the spherical body bearing supports the spherical body in the shape of a circular ring, and the separation preventing member makes the spherical body to be in pressure contact with the spherical body bearing by touching at least one point on the spherical body.
(Structure 17)

The image forming apparatus according to either one of Structure 2–Structure 4 and Structure 9–Structure 16 above, wherein a distance keeping means that keeps a distance between the exposure unit and the second supporting section and an elastic member that presses the exposure unit against the second supporting section are provided in the vicinity of the second supporting section in which the second supporting point is provided.
(Structure 18)

The image forming apparatus according to either one of Structure 1–Structure 17, wherein the first supporting section is composed of a driving screw and an engagement plate that engages with the driving screw, and the first adjustment means is composed of the driving screw, the engagement plate and a driving source that drives the driving screw.
(Structure 19)

The image forming apparatus according to either one of Structure 1–Structure 18, wherein the second supporting section is composed of a driving screw and an engagement plate that engages with the driving screw, and the second adjustment means is composed of the driving screw, the engagement plate and a driving source that drives the driving screw.
(Structure 20)

The image forming apparatus according to Structure 18 or Structure 19, wherein the engagement plate stated above is composed of two sheets which engage with the driving screw respectively in two directions which are opposite to each other.
(Structure 21)

The image forming apparatus according to Structure 20, wherein the two engagement sheets are formed as protruded sections extended from one sheet of common base section.
(Structure 22)

The image forming apparatus according to Structure 20 or Structure 21, wherein the two engagement sheets engage with the driving screw at two positions which are deviated in terms of phase by approximately a half of a pitch of the driving screw each other.
(Structure 23)

The image forming apparatus according to either one of Structure 1–Structure 17, wherein the first supporting section is composed of a driving male screw and an engagement block which has a female screw that engages with the driving male screw and is fixed on the exposure unit, and the first adjustment means is composed of the driving male screw, the engagement block and a driving source that drives the driving screw.
(Structure 24)

The image forming apparatus according to either one of Structure 1–Structure 17, wherein the second supporting section is composed of a driving male screw and an engagement block which has a female screw that engages with the driving male screw and is fixed on the exposure unit, and the second adjustment means is composed of the driving male screw, the engagement block and a driving source that drives the driving screw.
(Structure 25)

The image forming apparatus according to Structure 23, wherein an engagement clearance between the driving male screw and the female screw is made to be 1.5 times the maximum position correction amount of the exposure unit or more, so that rotating operations of the driving male screw in the first supporting section may not be interrupted.

(Structure 26)

The image forming apparatus according to Structure 24, wherein an engagement clearance between the driving male screw and the female screw is made to be 1.5 times the maximum position correction amount of the exposure unit or more, so that rotating operations of the driving male screw in the second supporting section may not be interrupted.

(Structure 27)

The image forming apparatus according to either one of Structure 23–Structure 26, wherein the engagement block has two connecting members protruded in the direction perpendicular to a rotary axis of the driving male screw, and the engagement member is combined with the exposure unit by the connecting member.

(Structure 28)

The image forming apparatus according to either one of Structure 1–Structure 17, wherein the first supporting section is composed of a driving male screw, an engagement block that engages with the driving male screw and a driving source that drives the driving screw, and there are provided on the engagement block a hole through which the driving male screw enters and an engagement member that has a tip portion engaging with the driving male screw and engages with the engagement block through screw.

(Structure 29)

The image forming apparatus according to either one of Structure 1–Structure 17, wherein the second supporting section is composed of a driving male screw, an engagement block that engages with the driving male screw and a driving source that drives the driving screw, and there are provided on the engagement block a hole through which the driving male screw enters and an engagement member that has a tip portion engaging with the driving male screw and engages with the engagement block through screw.

(Structure 30)

The image forming apparatus according to Structure 1 or Structure 3, wherein a plurality of the exposure units are provided, and the first adjustment means stated above is provided on each of the plural exposure units.

(Structure 31)

The image forming apparatus according to Structure 1 or Structure 3, wherein a plurality of the exposure units are provided, and the second adjustment means stated above is provided on each of the plural exposure units.

(Structure 32)

The image forming apparatus according to Structure 3, wherein a plurality of the exposure units are provided, and the first adjustment means and the second adjustment means both stated above are provided on each of the plural exposure units.

(Structure 33)

The image forming apparatus according to Structure 1 or Structure 3, wherein the first adjustment mean has a driving source composed of a motor.

(Structure 34)

The image forming apparatus according to Structure 2 or Structure 3, wherein the second adjustment mean has a driving source composed of a motor.

(Structure 35)

The image forming apparatus according to Structure 1 or Structure 3, wherein the first adjustment mean has a driving source composed of a layered piezoelectric actuator.

(Structure 36)

The image forming apparatus according to Structure 2 or Structure 3, wherein the second adjustment mean has a driving source composed of a layered piezoelectric actuator.

(Structure 37)

An image forming apparatus having therein an exposure unit composed of a laser light source and a scanning optical system that deflects light coming from the laser light source and emits a scanning beam, a first supporting means that supports the exposure unit rotatably, a second supporting means that is in a form of a circular arc whose center is the first supporting means and supports the exposure unit movably along the circular arc, and a magnification adjustment means that adjusts variation of magnification in the primary scanning direction of the scanning optical system by the rotation around the first supporting means.

(Structure 38)

An image forming apparatus having therein an exposure unit composed of a laser light source and a scanning optical system that deflects light coming from the laser light source and emits a scanning beam, and an inclination adjustment means supporting the exposure unit, having a supporting shaft that is almost in parallel with an optical axis of the scanning optical system and adjusting an inclination in the primary scanning direction by rotating the exposure unit on the center of the supporting shaft.

(Structure 39)

An assembling method of an exposure unit for assembling the exposure unit for an image forming apparatus having therein a photoreceptor, a charging unit that charges the photoreceptor, a exposure unit that conducts scanning exposure on the photoreceptor with a light beam to form an electrostatic latent image and a developing unit that develops the electrostatic latent image formed on the photoreceptor, and having at least a plurality of the exposure units, wherein each of the exposure units is attached to a supporting means so that a position of the exposure unit is corrected, and then, the clearance formed between the plural supporting means is filled with melted resins so that the exposure units and a distance between the exposure units are fixed.

(Structure 40)

The assembling method of an exposure unit according to Structure 39, wherein each of the plural supporting means has a plane crossing in the direction in which the plural exposure units are separated each other, and mutual exfoliation is prevented by resistance of the resin itself filled in the clearance formed by the crossing planes.

(Structure 41)

The assembling method of an exposure unit according to Structure 39 or Structure 40, wherein the supporting means is made of resin, and a space between the supporting means is filled with resin that is the same in terms of a type as the resin of which the supporting means is made, and thereby the supporting means are combined each other through their clearances.

(Structure 42)

An assembling method of an exposure unit for assembling the exposure unit for an image forming apparatus having therein a charging unit that charges the photoreceptor, an exposure unit that conducts scanning exposure on the photoreceptor with a light beam and a plurality of image forming sections each having a developing unit that develops an electrostatic latent image formed on the photoreceptor which are arranged to face the photoreceptor, wherein each of the exposure units is attached to a supporting means so that a position of the exposure unit is corrected, and then, the clearance formed between the plural supporting means is filled with melted resins for fixing the position so that the exposure units and a distance between the exposure units are fixed.

(Structure 43)

The assembling method of an exposure unit according to Structure 42, wherein each of the plural supporting means has a plane crossing in the direction in which the plural exposure units are separated each other, and mutual exfoliation is prevented by resistance of the resin itself filled in the clearance formed by the crossing planes.

(Structure 44)

The assembling method of an exposure unit according to Structure 42 or Structure 43, wherein the supporting means is made of resin, and a space between the supporting means is filled with resin that is the same in terms of a type as the resin of which the supporting means is made, and thereby the supporting means are combined each other through their clearances.

BRIEF DESCRIPTION OF THE DRAWINGS

FIG. 19 is a diagram showing another example of a combination section between exposure units.

DETAILED DESCRIPTION OF THE PREFERRED EMBODIMENT

Embodiment 1

Embodiment 1 of the invention will be explained as follows, referring to FIGS. 1–3.

Figure 1:
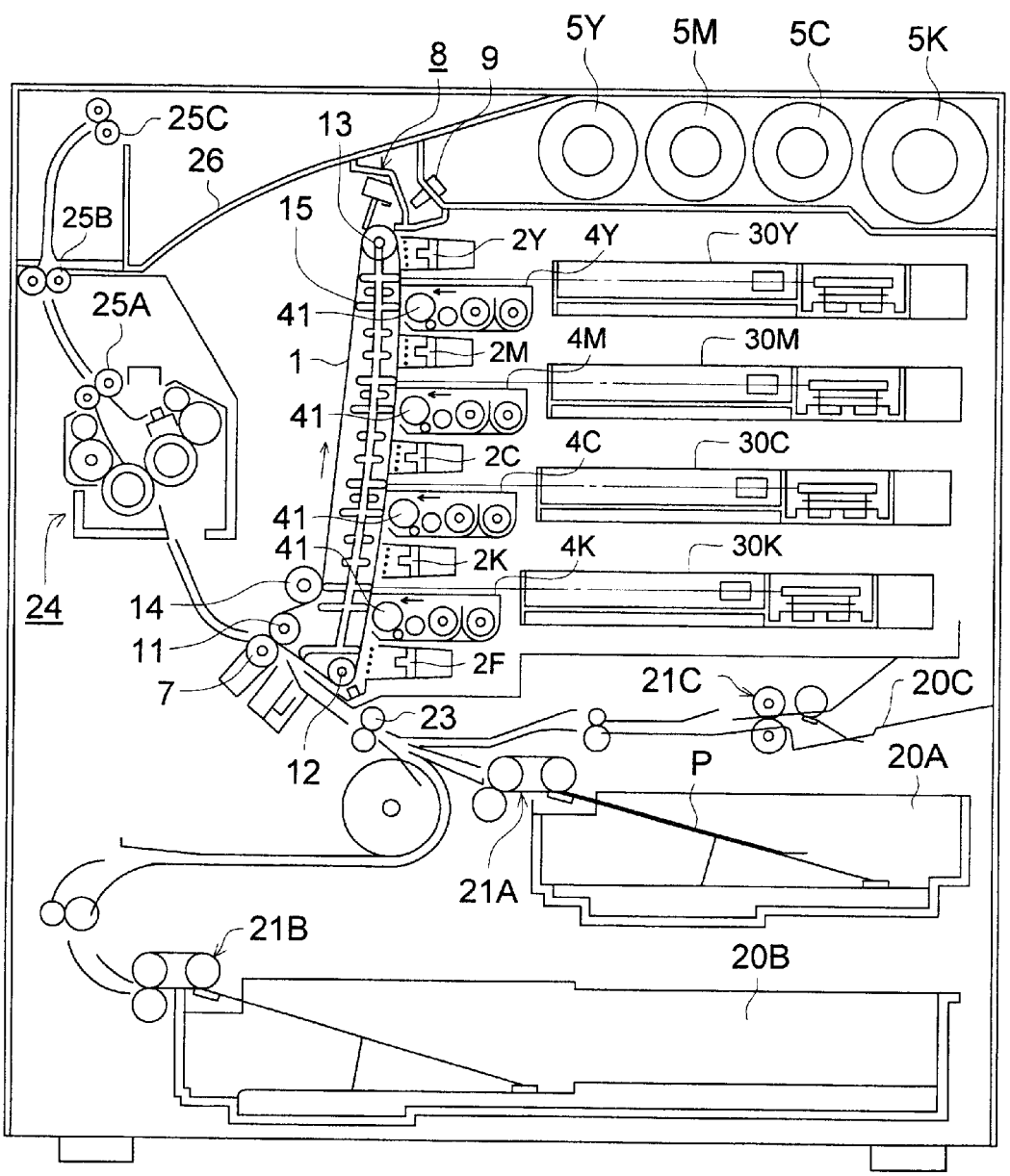
FIG. 1 is a diagram showing the whole of an image forming apparatus related to Embodiment 1 of the invention.
Figure 2:
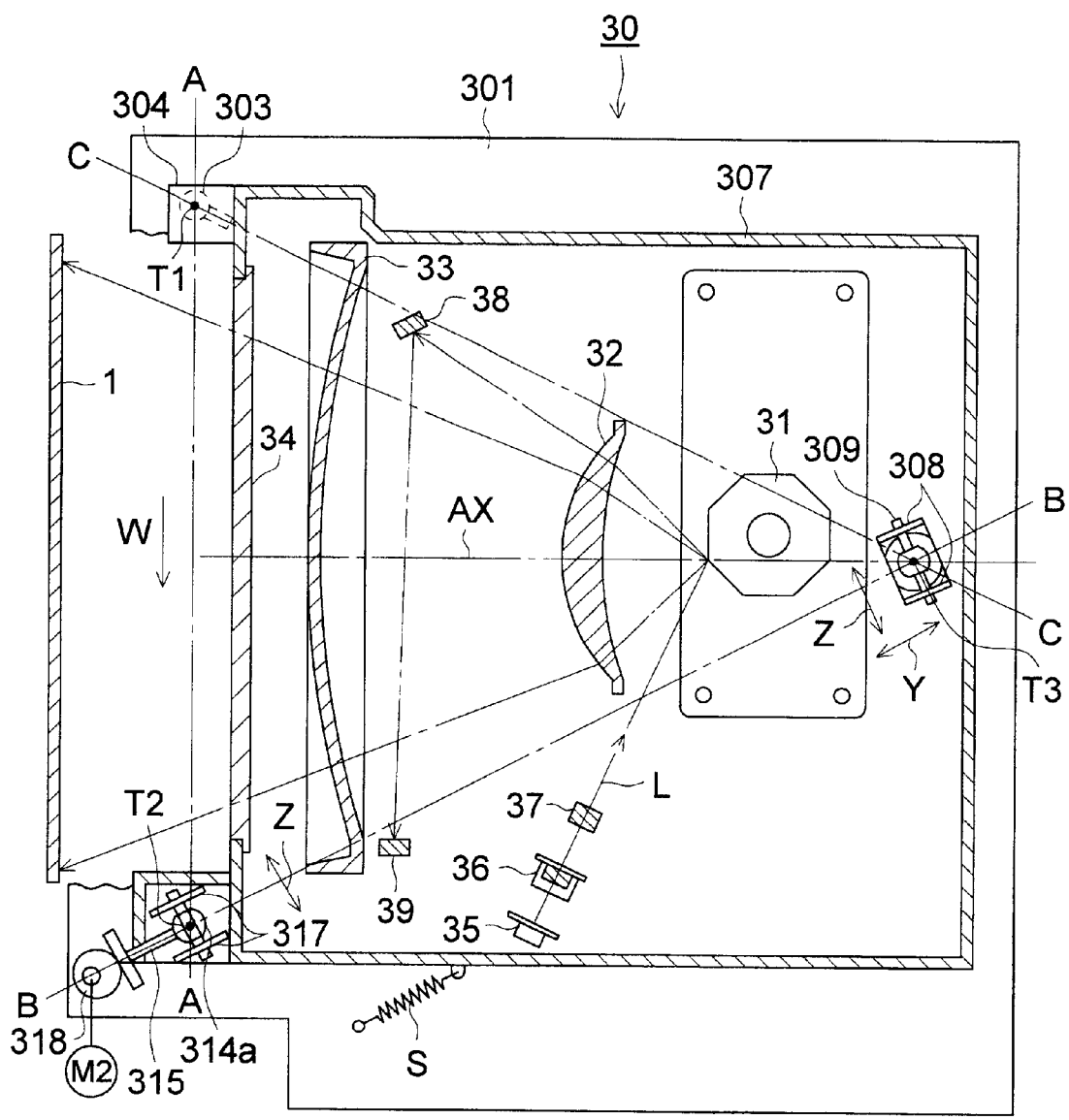
FIG. 2 is a sectional view of a top surface of an exposure unit of an image forming apparatus related to Embodiment 1 of the invention.
Figure 3:
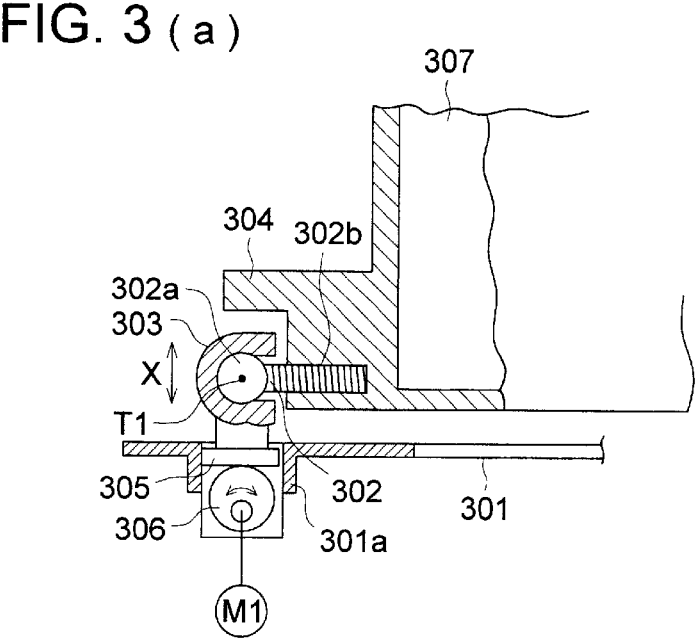
FIG. 3 is a diagram showing a first and a second supporting sections of the exposure unit.
Figure 3:
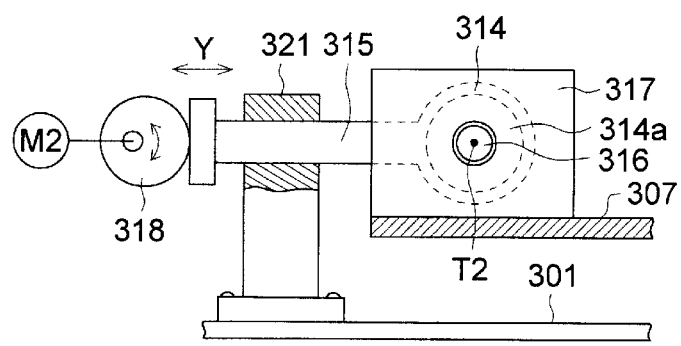
Figure 3:
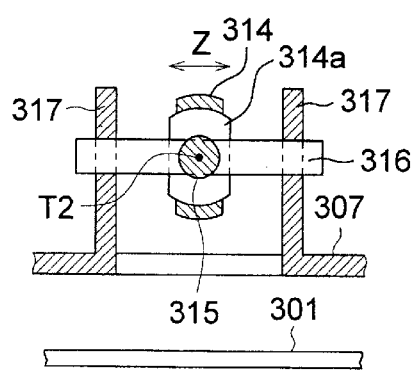

FIG. 1 is a diagram showing the whole of an image forming apparatus related to Embodiment 1, FIG. 2 is a sectional view of a top surface of an exposure unit of an image forming apparatus related to Embodiment 1, and FIG. 3 is a diagram showing a first supporting section and a second supporting section of the exposure unit in FIG. 2.

Belt-shaped photoreceptor 1 wherein an organic photoconductive layer is formed on a conductive base body is trained about driving roller 11 and driven rollers 12 and 13 to be given appropriate tension by tension roller 14, and is rotated as shown with an arrow. Around the photoreceptor 1, there are arranged image forming sections each forming each of a yellow image, a magenta image, a cyan image and a black image through charging, exposure and developing. The image forming section for the yellow image is composed of charging unit 2Y composed of a scorotron charger, exposure unit 30Y having a light source of a semiconductor laser and a scanning optical system, and developing unit 4Y having developing sleeve 41 to conduct reversal development. In the same way, the magenta image forming section is composed of charging unit 2M, exposure unit 30M and developing unit 4M, the cyan image forming section is composed of charging unit 2C, exposure unit 30C and developing unit 4C, and the black image forming section is composed of charging unit 2K, exposure unit 30K and developing unit 4K.

Bias voltage whose polarity is the same as that of an electrostatic latent image on the photoreceptor 1 is impressed on the developing sleeve 41 in each of the developing units 4Y, 4M, 4C and 4K, and each of these developing units conducts non-contact and reversal development to form a toner image on the photoreceptor 1. Toner in each color is supplied to each of the developing units 4Y, 4M, 4C and 4K from each of toner containers 5Y, 5M, 5C and 5K.

Further, charging unit 2F, transfer unit 7 composed of a transfer roller on which transfer voltage is impressed and cleaning unit 8 are arranged to face the photoreceptor 1.

Sheet feeding cassettes 20A and 20B each being loaded with recording sheet P on which an image is formed are provided at the lower portion of an image forming apparatus, and manual sheet feeding stand 20C is provided on the side of the image forming apparatus, and each of sheet feeding sections 21A, 21B and 21C provided respectively on the sheet feeding cassettes and the manual sheet feeding stand feeds out recording sheet P toward the transfer unit 7. The numeral 23 represents a registration roller that conveys recording sheet P to the transfer unit 7 in synchronization with image forming on the photoreceptor 1. The numeral 24 represents a fixing unit having a heating roller and a pressing roller, while, 25A, 25B and 25C represent conveyance rollers which convey recording sheet P, and 26 represents a sheet ejection tray on which recording sheets P ejected are stacked.

In image forming, the photoreceptor 1 rotates as shown with an arrow, and in accordance with rotation of the photoreceptor 1, each of the yellow image forming section, the magenta image forming section, the cyan image forming section and the black image forming section forms a toner image of each color on the photoreceptor 1 through charging, exposure and developing under the controlled timing, thus, a full color toner image composed of the superposed toner images of various colors is formed on the photoreceptor 1. For the full color toner image thus formed, voltage is adjusted by charging unit 2F.

In synchronization with forming of a full color toner image on the photoreceptor 1, recording sheet P is conveyed from the registration roller 23 to be brought into close contact with the photoreceptor 1 at transfer unit 7, and the full color toner image on the photoreceptor 1 is transferred onto the recording sheet P by transfer voltage of the transfer unit 7.

The full color toner image transferred onto the recording sheet P is fixed by fixing unit 24, thus, the full color toner image is on the recording sheet P. The recording sheet P which has passed through the fixing unit 24 is conveyed by conveyance rollers 25A, 25B and 25C to be ejected to sheet ejection tray 26. The photoreceptor 1 which has passed through the transfer position is subjected to removing of remaining toner by cleaning unit 8, and is subjected to neutralizing by neutralizing lamp 9 so that conditions of the surface of the photoreceptor 1 are uniformed.

Each of exposure units 30Y, 30M, 30C and 30K in the present embodiment conducts scanning exposure through scanning by a laser beam in the primary scanning direction and through scanning in the sub-scanning direction by movement of photoreceptor 1 to form an electrostatic latent image on the photoreceptor 1, and each exposure unit is provided with an adjustment mechanism for scanning exposure which conducts adjustment for variation of a magnification in the primary scanning direction, namely for lateral magnification and adjustment for an inclination in the primary scanning direction.

An adjustment mechanism used for exposure units 30M, 30C and 30K in common will be explained as follows, wherein these exposure units will be called exposure unit 30 in the explanation. Incidentally, it is not necessary that all of the exposure units 30Y, 30M, 30C and 30K are provided with the aforesaid adjustment mechanism, and either one of the exposure units may be provided with no adjustment mechanism to be the standard for conducting at least one of the adjustment of an inclination of the exposure unit in the primary scanning direction and the adjustment of variation of magnification in the primary scanning direction of the other exposure units.

Exposure unit 30 has therein a laser light source composed of semiconductor laser 35 and a scanning optical system composed of first cylindrical lens 37, polygon mirror unit 31, fθ lens 32 and second cylindrical lens 33. These laser light source and scanning optical system are fixed on box-shaped frame object 307. A light beam emitted from the semiconductor laser 35 is deflected by a polygon rotating at high speed in polygon mirror unit 31 to scan the photoreceptor 1 at high speed in the primary scanning direction, as shown with arrow W.

Frame object 307 is supported by supporting plate 301 that is fixed on an image forming apparatus at three points of T1, T2 and T3 representing intersecting points of one-dot chain lines A—A, B—B and C—C. In this way, the exposure unit 30 is supported on the image forming apparatus at the first supporting point T1, the second supporting point T2 and the third supporting point T3.

The structure of a first supporting section for the frame object 307 at the first supporting point is shown in FIG. 3(a).

On foot section 304 of the frame object 307, there is fixed connecting member 302 that is connected by screw section 302b. The connecting member 302 has the screw portion 302b and spherical body 302a, and the spherical body 302a is supported by spherical body bearing 303 to be rotatable in all directions, including vertical and horizontal directions. The connecting member 302 and the spherical body bearing 303 constitute the first supporting section. The spherical body bearing 303 is guided to be movable vertically as shown with arrow X by intermediate member 305 and guiding portion 301a provided on supporting plate 301. The intermediate member 305 is driven vertically by eccentric cam 306 that is driven by motor M1 to rotate.

The motor M1 and eccentric cam 306 constitute a first adjustment means that adjusts an inclination of a light beam in the primary scanning direction. Incidentally, it is also possible to use another driving means such as a layered piezoelectric actuator for the first adjustment means, in place of the motor M1 and eccentric cam.

Frame object 307 is driven by motor M1 to move up and down vertically in the direction of arrow X, and this vertical movement makes exposure unit 30 to rotate around an axis of one-dot chain line B—B, and thereby, an angle of the primary scanning direction shown with W is changed and an inclination of the primary scanning direction is adjusted.

Structure of the second supporting section for frame object 307 at the second supporting point T2 is shown in FIG. 2 and FIG. 3.

On a pair of lifted portions 317 provided on the frame object 307, there is supported connecting member 316. The connecting member 316 is constructed to be solid with the lifted portions 317. Bar-shaped connecting member 316 shown in FIG. 3(c) is inserted through a round hole provided on the lifted portions 317. On the connecting member 316, there is arranged partial spherical body 314a capable of sliding on the connecting member 316 in the direction of arrow Z. This partial spherical body 314a is supported on spherical body bearing 314 to be rotatable in all directions. The spherical body bearing 314 is supported by intermediate member 315, and the intermediate member 315 is guided by holding section 321 to be capable of sliding in the direction of arrow Y. The holding section 321 is fixed on supporting plate 301. The intermediate member 315 is driven to move from side to side by eccentric cam 322 that is driven by motor M2.

The motor M2 and eccentric cam 317 constitute a second adjustment means that adjusts variation in magnification of a light beam in the primary scanning direction. Incidentally, it is also possible to use another driving means such as a layered piezoelectric actuator for the second adjustment means, in place of the motor M2 and eccentric cam.

Frame object 307 is driven by motor M2 to move from side to side in the direction of arrow Y, and this movement from side to side makes exposure unit 30 to rotate around the first supporting point as a rotary center, and thereby, an optical path length from a reflection point on polygon mirror unit 31 to the surface to be scanned is changed to be different at each position on the scanning line, and thus, variation of magnification in the primary scanning direction is adjusted.

Figure 4:
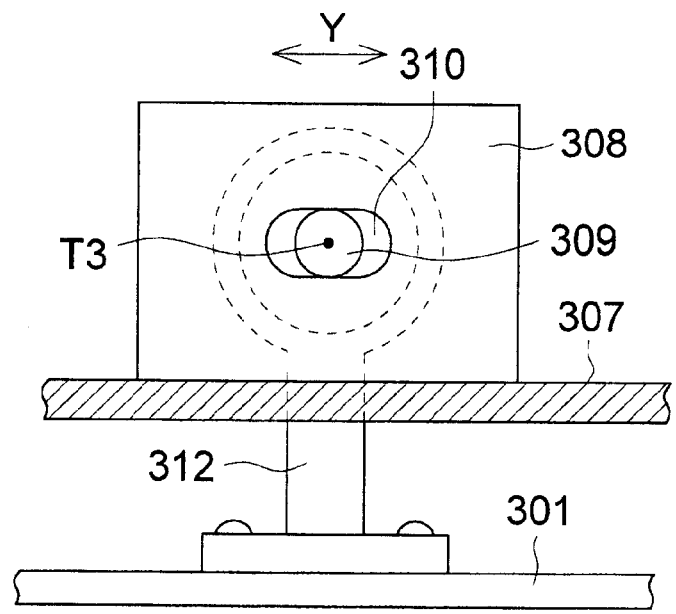
FIG. 4 is a diagram showing a third supporting section of the exposure unit.
Figure 4:
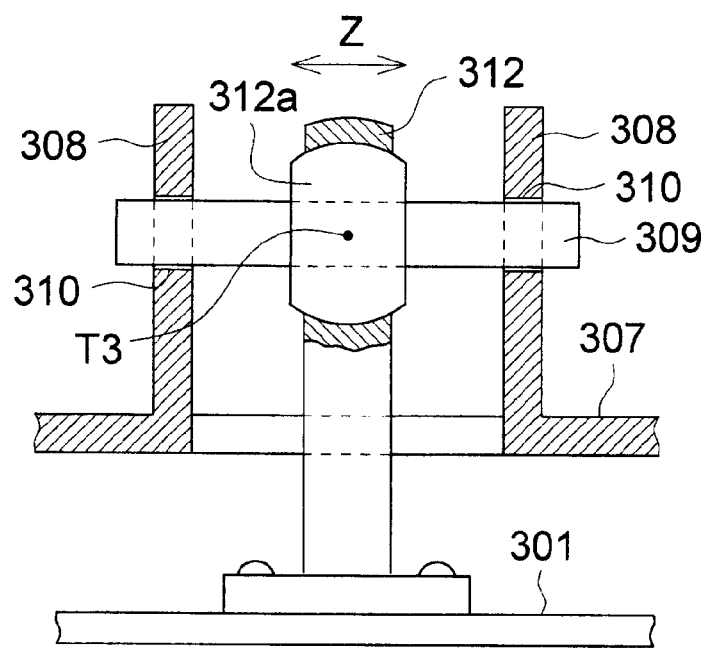

Structure of the third supporting section for frame object 307 at the third supporting point T3 is shown in FIG. 4.

On a pair of lifted portions 308 provided on the frame object 307, there is supported connecting member 309. The connecting member 309 is inserted through elongated hole provided on the lifted portions 308, and it can move in the direction arrow Y in FIG. 4(*a*). On the connecting member 309, there is arranged partial spherical body 312*a* capable of sliding on the connecting member 309 in the direction of arrow Z. This partial spherical body 312*a* is supported on spherical body bearing 312 to be rotatable in all directions. The spherical body bearing 314 is supported by intermediate member 315, and the intermediate member 315 is guided by holding section 321 to be capable of sliding in the direction of arrow Y. The holding section 321 is fixed on supporting plate 301. The intermediate member 315 is driven to move from side to side by eccentric cam 322 that is driven by motor M2.

Owing to the supporting structure of the frame object 307, the frame object 307 can move at the third supporting point T3 in directions of Y and Z both are perpendicular to each other, and this movement is a rotary movement around the first supporting point T1.

Being driven by motor M1 to rotate, the frame object 307 moves up and down at the first supporting point and rotates around an axis of one-dot chain line B. Owing to this rotation, an inclination of laser beam L in the primary scanning direction W and an inclination of the scanning line on the surface to be scanned are adjusted. The adjustment is conducted in a way wherein, for example, a plurality of patterns which are in parallel with the primary scanning direction are written by a plurality of scanning optical devices to form images, and then, frame object 307 is moved in the direction X (FIG. 3(*a*)) so that a difference in inclination of the formed line images may be reduced to zero between exposure units.

Being driven by motor M2 to rotate, the frame object 307 rotates around the first supporting point. Owing to this rotation, a difference of an optical path length from a reflection point on polygon mirror unit 31 to the surface to be scanned is adjusted and an optical path length at the position of an image height is made to be appropriate, and thereby, variation of lateral magnification in the primary scanning direction, namely, a difference of magnifications at both ends in the primary scanning direction is adjusted. This adjustment is conducted by measuring variation of lateral magnification, namely, unevenness of magnification in the primary scanning direction, from an image formed by conducting scanning exposure.

With regard to variation in magnification in the primary scanning direction, it is possible to detect it by measuring at least three points of an image formed through scanning exposure in each exposure unit. For example, an image of a line that is perpendicular to the optical scanning direction is formed by each exposure unit at both ends and a central portion, and a difference of positions in the primary scanning direction of the line image formed by each exposure unit is detected at each measurement point, and thereby, it is possible to detect a difference between magnification of the entire scanning area and magnification at the upstream side and the downstream side of the scanning line, with an optical axis serving as a boundary. Furthermore, when image position detecting patterns ML, MC and MR each being in a shape of "inverted L" are made by a line that is in parallel with the primary scanning direction and a line inclined from the primary scanning line by 45° in place of the line perpendicular to the optical scanning direction as shown in FIG. 20, the position of the exposure unit can be detected at less cost by LED SS1 and light-receiving element SS2 in place of conventional line CCD.

Figure 20:
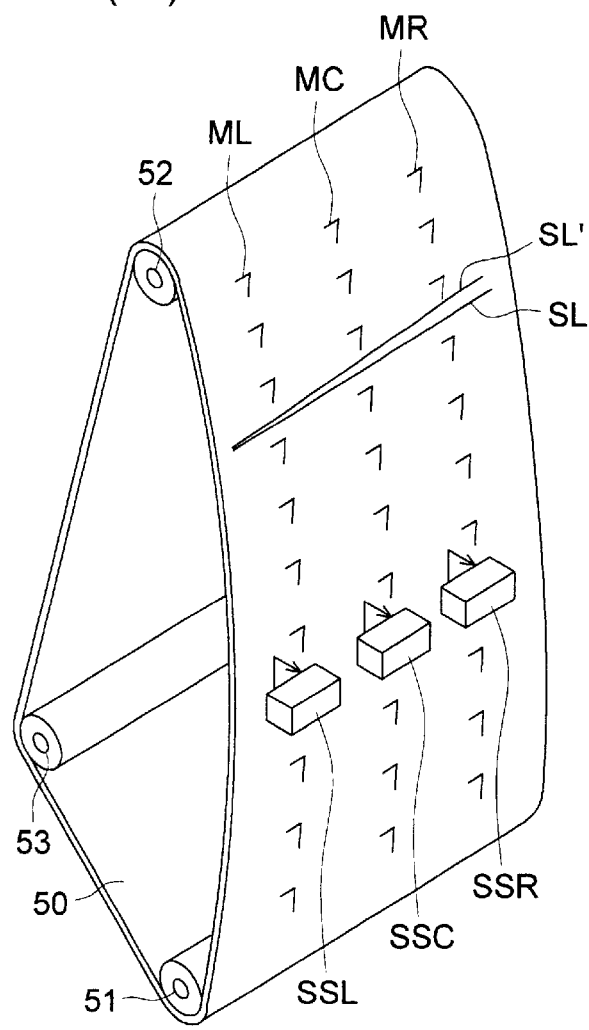
FIG. 20 is a diagram for illustrating adjustment of a position between exposure units.
Figure 20:
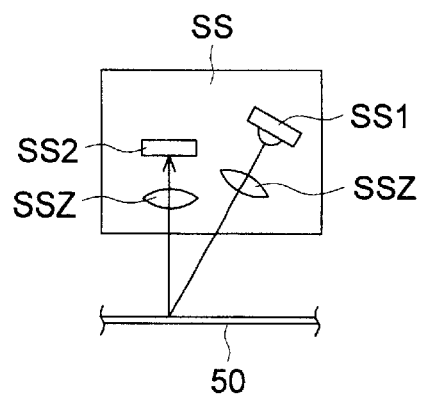

FIG. 20 shows a detecting means to detect an inclination of a scanning direction in FIG. 2, namely, for example, a detecting means to detect that scanning line SL in FIG. 20 has inclined to be SL'. Marks shown with ML and MR are formed respectively on both end portions of photoreceptor 1 and a mark shown with MC is formed on the central portion. Each of these marks is a mark in a shape of "inverted L" that is formed by a segment that is in parallel with the scanning line and a segment that intersects the scanning line SL to be tilted from it by 45°. These marks are detected by sensors SSL, SSC and SSR, then, an inclination of the scanning line is detected by the timing of detection signal for a segment of each of marks ML and MR, and a magnification in the primary scanning direction is detected by a difference between detection timing for the parallel segment and detection timing for the intersecting segment (a distance between both segments) for each mark obtained by detecting marks ML, MC and MR.

Embodiment 2

Figure 5:
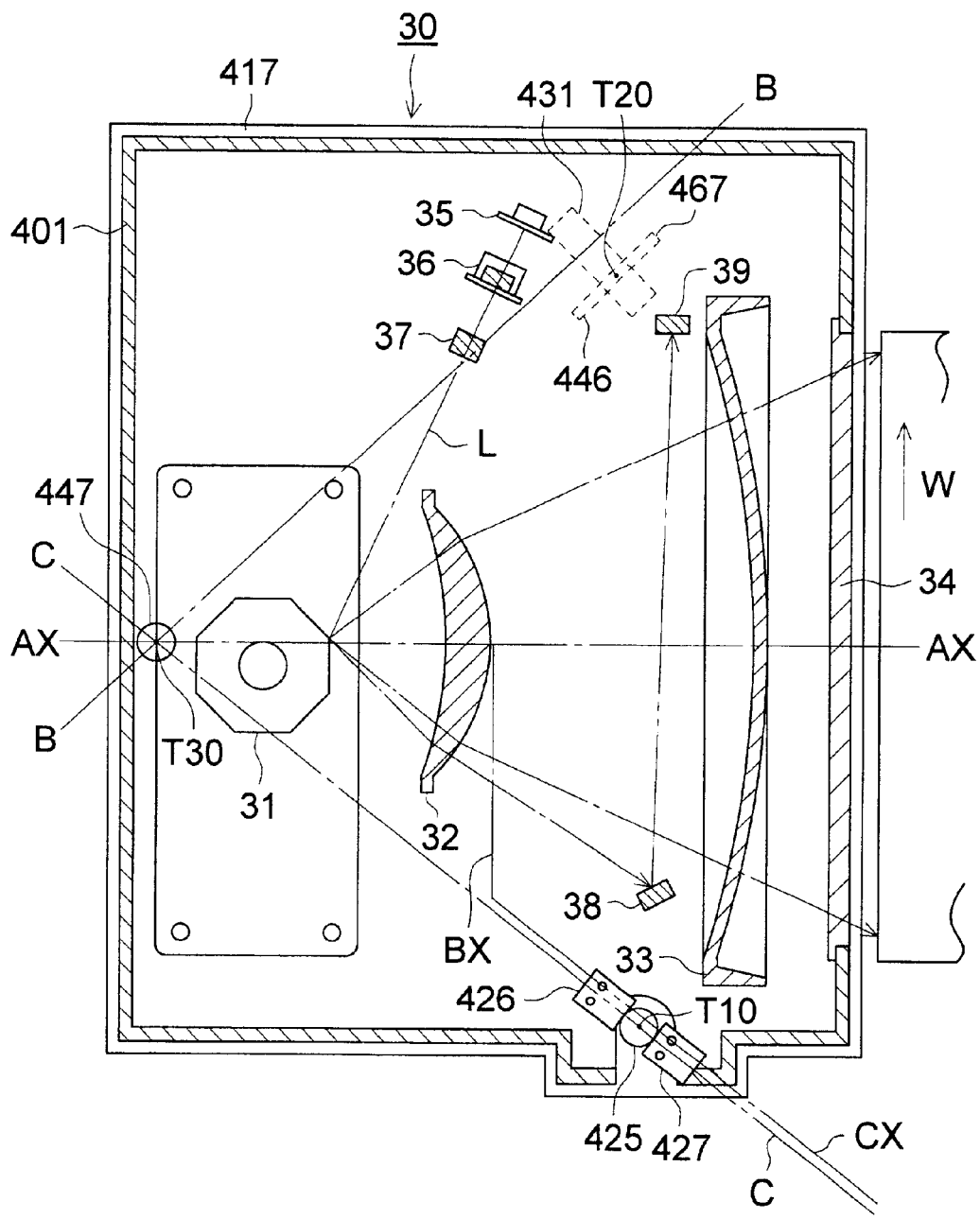
FIG. 5 is a sectional view of a top surface of an exposure unit of an image forming apparatus related to Embodiment 2 of the invention.
Figure 6:
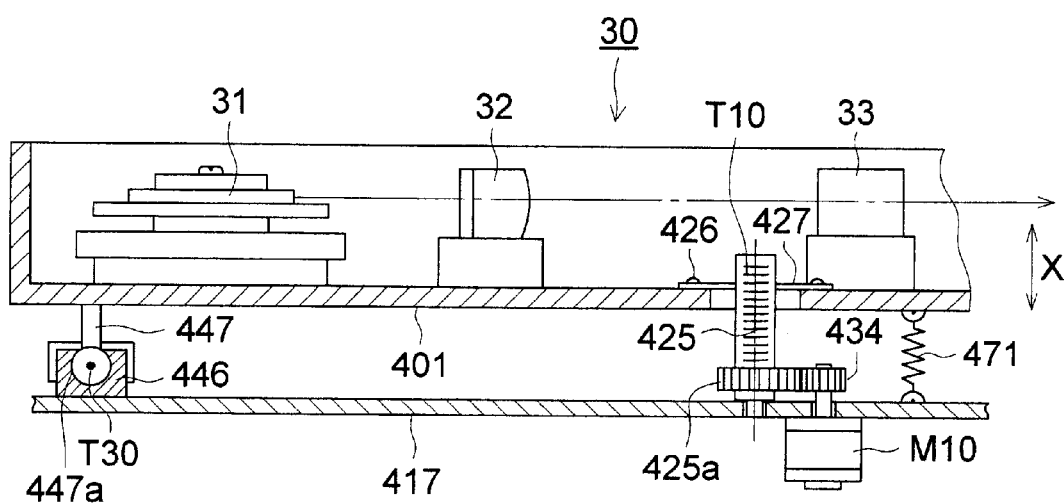
FIG. 6 is a sectional view along lines AX–BX–CX in FIG. 5.

Embodiment 2 of the invention will be explained as follows, referring to FIGS. 5–13. FIG. 5 is a sectional view of a top surface of an exposure unit in Embodiment 2 of the invention. Parts identical to those in FIG. 2 are given the same symbols. FIG. 6 is a sectional view along lines AX–BX–CX in FIG. 5.

Frame object 401 that supports a light source and a scanning optical system is supported by supporting plate 417 fixed on an image forming apparatus main body at three points of first supporting point T10, second supporting point T20 and third supporting point T30. The structure of the third supporting section at the third supporting point T30 is as follows.

Connecting member 447 that connects frame object 401 with supporting plate 417 has spherical body 447*a*. On the supporting plate 417, on the other hand, there is fixed spherical body bearing 446 that supports the spherical body 447*a* rotatably in all directions including vertical and horizontal directions. Due to this supporting structure, the frame object 401 is supported rotatably in all directions including vertical and horizontal directions, on the center of the third supporting point T30. In the present embodiment, as stated above, the third supporting point T30 that is a fixed point supporting section among three supporting sections is provided on a plane that includes optical axis center AX of the scanning optical system and is perpendicular to the scanning plane. When the third supporting point T30 is arranged on the plane stated above, movement adjustment for an exposure unit in the plane that is in parallel with the scanning plane can be conducted almost symmetrically for the scanning area. It is therefore possible to conduct adjustment of magnification in the primary scanning direction uniformly on both sides of the scanning area about its center in the primary scanning direction.

FIG. 6 shows the structure of the first supporting section at the first supporting point T10 where the first adjustment means for adjusting inclination of the primary scanning direction of a light beam is provided. Next, the structure of the first supporting section will be explained as follows.

Each of two engagement flakes 426 and 427 made respectively of a thin and elastic metal plate is fixed at its one end on the frame object 401. On the other hand, driving screw 425 is provided on supporting plate 417 in a way that the screw can rotate but does not move vertically. First supporting point T10 is a point of intersection between a plane formed by the engagement flakes 426 and 427 and the driving screw 425. A screw portion of the driving screw 425 held by an unillustrated holding member engages with the engagement flakes 426 and 427. Further, on the driving screw 425, there is fixed gear 425a which is rotated by motor M10 through gear 434. There is further arranged spring 471 that presses frame object 401 downward on a supplemental basis, between the frame object 401 and the supporting plate 417. The motor M10, the driving screw 425 and the engagement flakes 426 and 427 constitute the first adjustment means.

The engagement flakes 426 and 427 receive a load downward in FIG. 6 and they also serve as an enduring member for the supporting plate 417 of exposure unit 30. When the driving screw 425 rotates, its point of engagement with the engagement flakes 426 and 427 moves vertically, and due to this, the exposure unit 30 rotates around a straight line connecting the third supporting point T30 and the second supporting point T20. Between the engagement flakes 426 and 427 and the driving screw 425, therefore, a clearance is naturally needed in the direction perpendicular to the axial direction of the driving screw 425. The engagement flakes 426 and 427 also serve as an enduring member for the supporting plate 417 of exposure unit 30, and even when another regulating means is provided for the positional regulation in the direction perpendicular to the axial direction of the driving screw 425, the first adjustment means is not affected adversely.

As another regulating means stated above, the second adjustment means described later may also be used, and another positional regulating means, for example, may also be provided by the means shown in the first embodiment or a means similar to that.

When motor M10 rotates, frame object 401 is rotated by engagement between the engagement flakes 426 and 427 and the driving screw 425, as shown with arrow X around the center of the third supporting point T30. By vertical movement of the frame object 401 in the direction of X, an inclination of a scanning line of light beam L is adjusted.

The structure of the second supporting section at the second supporting point T20 where the second adjustment means is provided is as follows.

Frame object 403 of the second supporting section is structured to be solid with frame object 401, and engagement flakes 466 and 467 are further fixed on the frame object 403. On supporting plate 417, on the other hand, there are formed lifted portions 468 and 469, and driving screw 431 is supported rotatably. On the driving screw 431, there is fixed gear 432 which is connected rotatably at high speed reduction ratio through rotation of motor M20 and worm gear 465 that is fixed on the rotary shaft of the motor M20. An extended portion of the frame object 403 comes in contact with a non-screw portion of the driving screw 431, and thereby, vertical positions of the frame object 401 and supporting plate 417 are regulated. The second supporting point T20 is a point of intersection between a plane formed by the engagement flakes 466 and 467 and the driving screw 431. There is further arranged spring 472 that presses on a supplemental basis. Further, the engagement flakes 466 and 467 engage with the driving screw 431, and spring 474 is provided to prevent engagement play between the engagement flakes 466 and 467 and the driving screw 431. Rotation of motor M20 is transmitted to the driving screw 431, and the engagement flakes 466 and 467 are moved from side to side by that rotation. The motor M20, the driving screw 431 and the engagement flakes 466 and 467 constitute the second adjustment means.

As stated above, the engagement flakes 466 and 467 are moved from side to side for the supporting plate 417 by the rotation of the motor M20. Namely, frame object 401 conducts a swiveling action on the third supporting point T30 that serves as a rotation center in a plane including a contact point between driving screw 425 of the first supporting point T10 and engagement flakes 426 and 427, the third supporting point T30 and a contact point between extended portion 403a of frame object 403 of the second supporting point T20 and a non-screw portion of the driving screw 431. This swiveling action adjusts variation of lateral magnification in the primary scanning direction.

Figure 10:
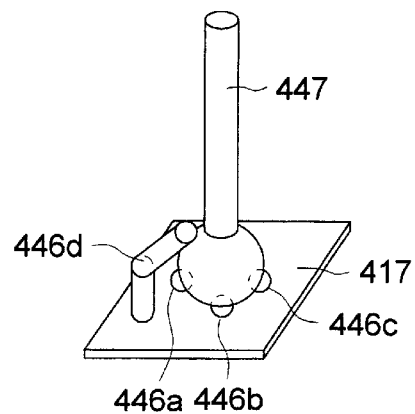
FIG. 10 is a diagram showing a concrete example of a supporting structure of a frame work in a third supporting point.
Figure 10:
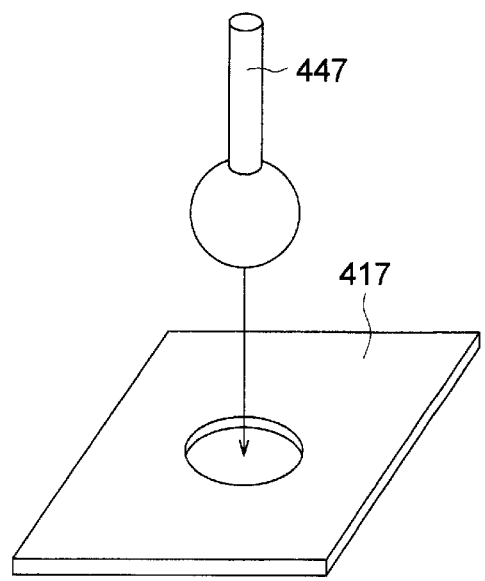
Figure 10:
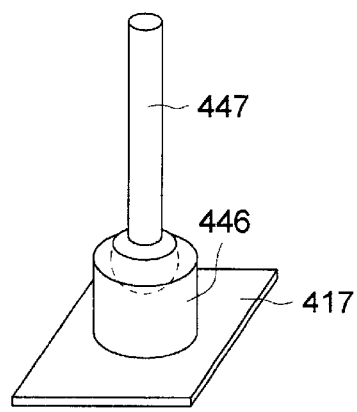
Figure 10:
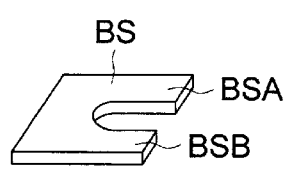
Figure 10:
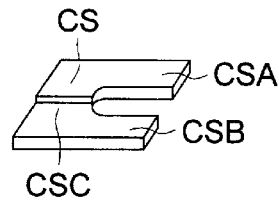

FIG. 10 shows a concrete example of the supporting structure of frame object 401 in the third supporting point T30.

In FIG. 10(a), three balls 446a, 446b and 446c which support at three points are used as a spherical body bearing that supports spherical body 447a of connecting member 447. Holding member 446d made of an elastic material makes the spherical body 447a to be in pressure contact with balls 446a, 446b and 446c. In FIG. 10(b), as a spherical body bearing that supports spherical body 447a of connecting member 447, a circular hole whose diameter is smaller than a diameter of spherical body 447a is made on supporting plate 417 to insert the spherical body 447a in the hole, and the spherical body 447a is made to be in pressure contact with supporting plate 417 by holding member 446d made of an elastic material in the same way as in FIG. 10(a). In FIG. 10(c), a spherical body of connecting member 447 is held by drawing of spherical body bearing 446.

Figure 7:
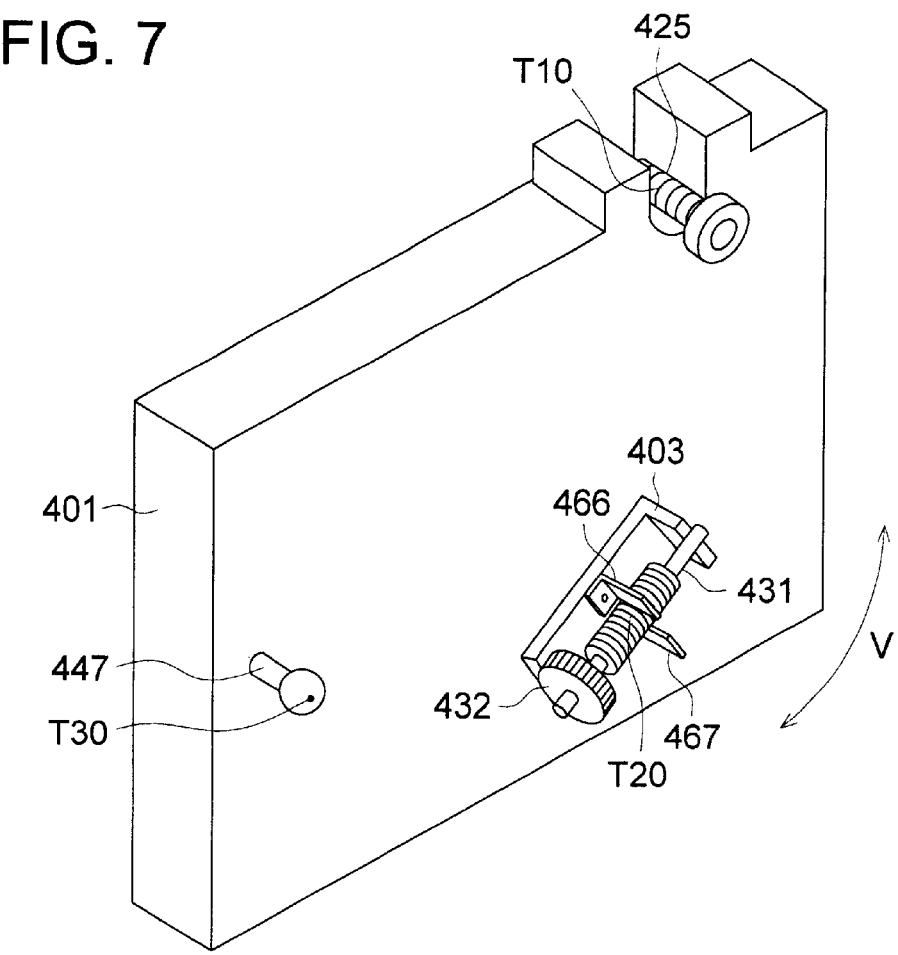
FIG. 7 is a diagram showing a supporting section of the exposure unit.
Figure 8:
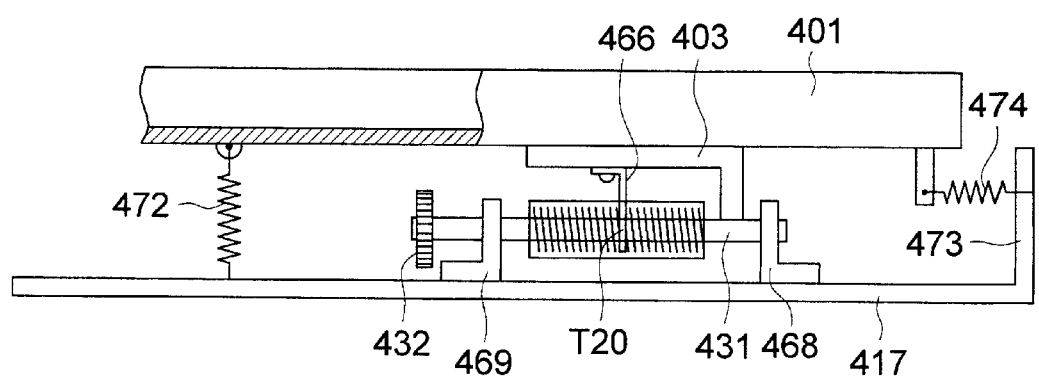
FIG. 8 is a diagram showing a supporting section of the exposure unit.
Figure 9:
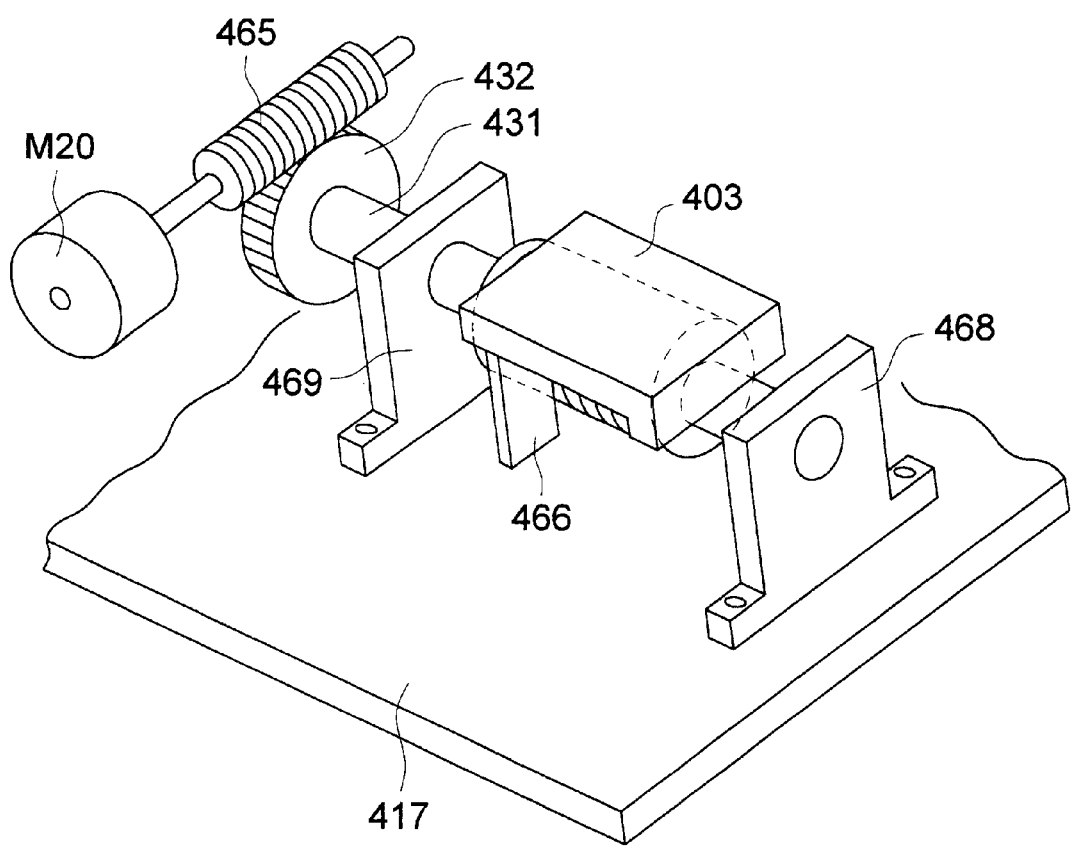
FIG. 9 is a diagram showing a supporting section of the exposure unit.

FIG. 10(d) and FIG. 10(e) show respectively a variation of engagement flakes 426 and 427 in FIG. 6 and a variation of engagement flakes 466 and 467 in FIG. 7. In the example shown in FIG. 10(d), protrusions BSA and BSB are provided on a sheet of flat plate BS, and the protrusions BSA and BSB form engagement flakes 426 and 427 or engagement flakes 466 and 467. In the example shown in FIG. 10(e), protrusions CSA and CSB are provided on plate CS on which step portion CSC is provided, and these protrusions form engagement flakes 426 and 427 or protrusions 466 and 467. In the example in FIG. 10(e), the step portion CSC makes the protrusions CSA and CSB to be formed with their positions shifted each other. As a result, the engagement flakes 426 and 427 engage with driving screw 425 to be shifted each other in terms of a phase by a pitch of the driving screw 425, while, the engagement flakes 466 and 467 engage with driving screw 431 to be shifted each other in terms of a phase by a pitch of the driving screw 431. In the example shown in FIG. 10(d), it is preferable that an elastic plate is used for flat plate GS, and it deforms elastically when it engages with a driving screw so that an appropriate engagement may be obtained. In the example shown in FIG. 10(e), an engagement is appropriate and accurate adjustment is possible, because step portion CSC makes positions of protrusions CSA and CSB to be deviated each other by a pitch of a driving screw.

Figure 11:
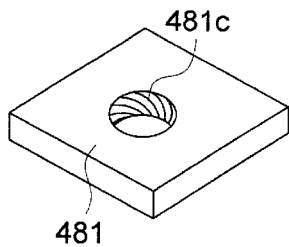
FIG. 11 is a diagram showing an example of a second adjustment means.
Figure 11:
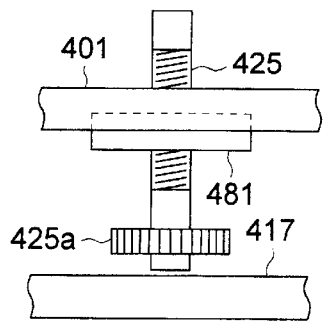
Figure 11:
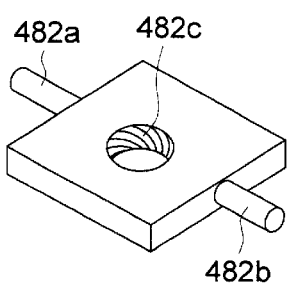
Figure 11:
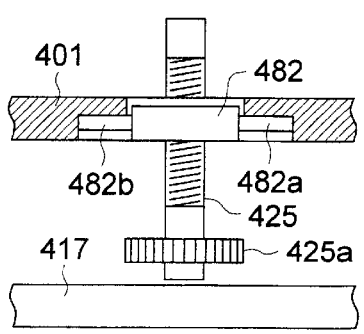
Figure 11:
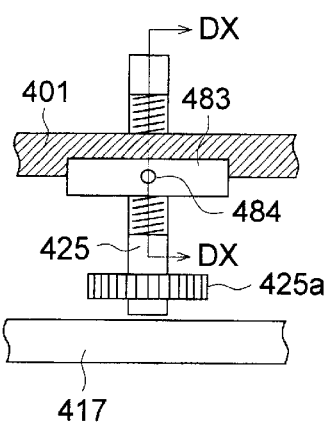
Figure 11:
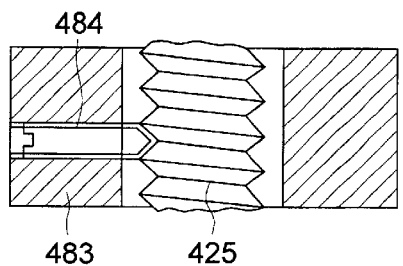
Figure 11:
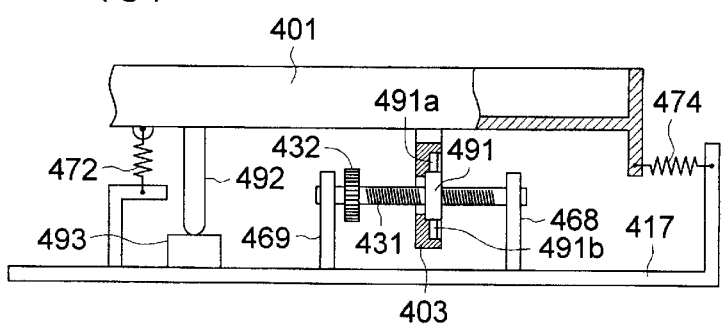

FIG. 11 shows examples of the first adjustment means for adjusting an inclination of the primary scanning direction of a scanning optical system and the second adjustment means for adjusting variation of magnification in the primary scanning direction of the scanning optical system.

In FIGS. 11(a) and 11(b), a driving screw (driving male screw) driven by a motor (not shown) is engaged with female screw 481c of engagement block 481, and the engagement block 481 is fixed in a recessed portion provided on frame object 401. Rotation of driving screw 425 makes the frame object 401 to move up and down relatively to supporting plate 417, and this movement represents rotating motion of exposure unit 30 around an axis passing through second supporting point T20 and third supporting point T30. In the adjustment wherein rotating motion of exposure unit 30 is caused by linear motion as stated above, there is caused mismatching theoretically between rotating motion and linear motion. However, when a distance between first supporting point T10 representing a center of rotation and second supporting point T20 at which linear motion is carried out is long enough, compared with a distance for movement by adjustment, the mismatching is absorbed by a clearance in the screw portion, and adjustment is not affected adversely by the mismatching. Incidentally, it has been confirmed that a preferable condition for the adjustment mechanism capable of absorbing the mismatching is that the screw portion has a clearance which makes an amount of adjustment that is 1.5 times the maximum amount of adjustment of exposure unit 30 (maximum value of a distance of movement by adjustment) or more to be possible.

In FIGS. 11(c) and 11(d), engagement block 482 having female screw 482c is connected with frame object 401 through bar-shaped connecting members 482a and 482b which are fitted in the engagement block 482. Driving screw 425 driven by a motor (not shown) is engaged with female screw 482c of engagement block 482. When gear 425a that fixes thereon driving screw 425 on which a male screw is formed is driven by a motor, the engagement block 482 moves up and down, and relative position of frame object 410 for supporting plate 417 is changed. In the example in FIGS. 11(c) and 11(d), the engagement block 482 is rotatable around the connecting members 482a and 482b. Therefore, errors for attachment of driving screw 425 are absorbed by this rotatable structure for attachment, and the engagement member 482 is self-adjusted even when angularity between driving shaft 425 and supporting plate 417 is not controlled accurately when the driving shaft is attached, which is effective for reducing assembling man-hour.

In FIGS. 11(e) and 11(f), driving screw 425 driven by a motor (not shown) is inserted through engagement block 483. The engagement block 483 is fixed in a recessed portion provided on frame object 401. FIG. 11(f) is an enlarged section along lines DX—DX in FIG. 11(e), and a tip portion of engagement member 484 inserted in engagement block 483 through screw engagement is engaged with a screw portion of driving screw 425. The first supporting point T10 is a point of intersection between a tip portion of engagement member 484 and driving screw 425. Rotation of driving screw 425 makes exposure unit 30 to make a rotating motion around an axis passing through second supporting point T20 and third supporting point T30. Movement of engagement block 483 caused by the driving screw 425 is linear motion, while, exposure unit 30 makes a rotating motion as stated above. The aforesaid adjustment mechanism that employs engagement member 484 absorbs mismatching between linear motion and rotating motion, and it reduces assembling man-hour in the assembly process such as accurate management of angularity, when attaching driving screw 425 on supporting plate 417.

The adjustment means shown in each of FIGS. 11(a)–11(f) is an example of a first adjustment means that adjusts an inclination in the primary scanning direction, while, an example shown in FIG. 11(g) is a concrete example of a second adjustment means that adjusts variation of magnification in the primary scanning direction.

In FIG. 11(g), lifted portions 468 and 469 both are fixed on supporting plate 417 are made to support driving screw 431, and engagement block 491 having a female screw as that shown in FIG. 11(a) is made to act on driving screw 431 (driving male screw) on which a male screw is formed. The engagement block 491 is connected with frame object 403 or 401 by means of connecting members 491a and 491b both provided on the engagement block 491.

When gear 432 on which driving screw 431 is fixed is driven by an un-illustrated motor, frame object 401 is moved horizontally, and thereby, variation of magnification of a scanning optical system in the primary scanning direction is adjusted. Incidentally, spring 474 is provided for absorbing a play in the adjustment mechanism. Further, protrusion 492 is provided on frame object 401, and stopper portion 493 corresponding to the protrusion 492 is provided on supporting plate 417. The protrusion 492 and stopper portion 493 constitute a distance keeping means which keeps the distance between exposure unit 30 and supporting plate 417 to be constant. The numeral 472 is an elastic member which makes the protrusion 492 to be in pressure contact with the stopper 493.

Embodiment 3

Figure 12:
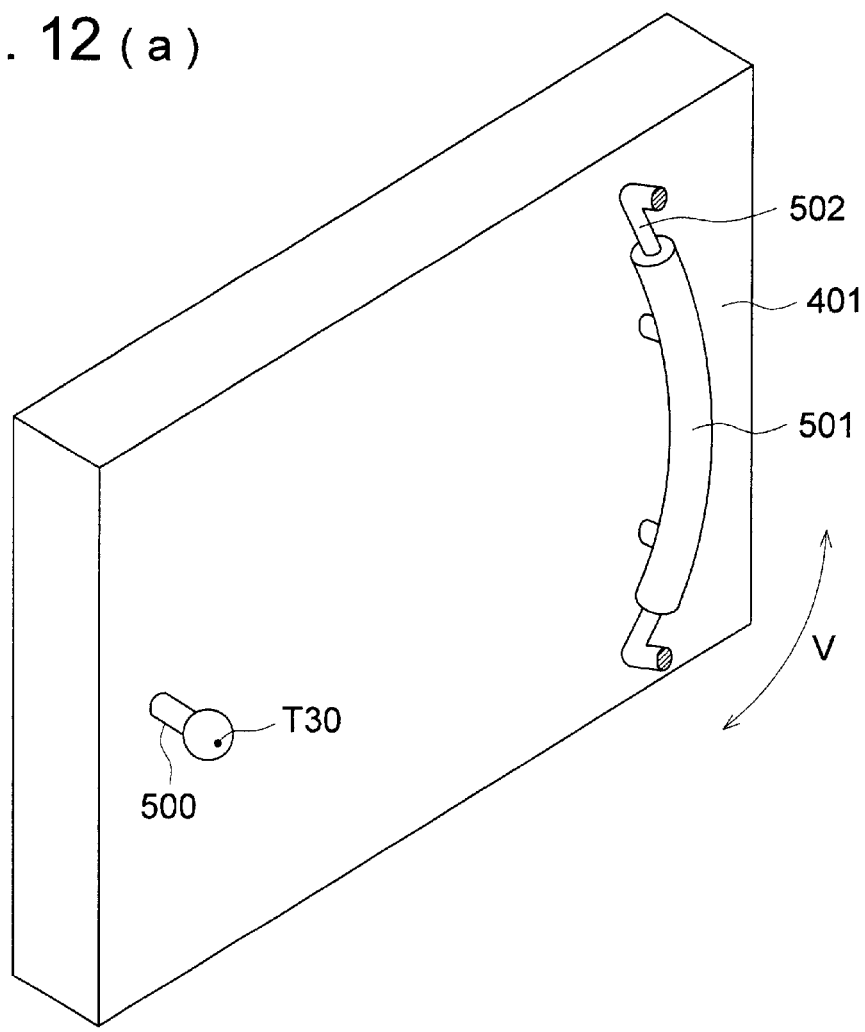
FIG. 12 is a diagram showing a supporting section of an exposure unit of an image forming apparatus related to Embodiment 3 of the invention.
Figure 12:
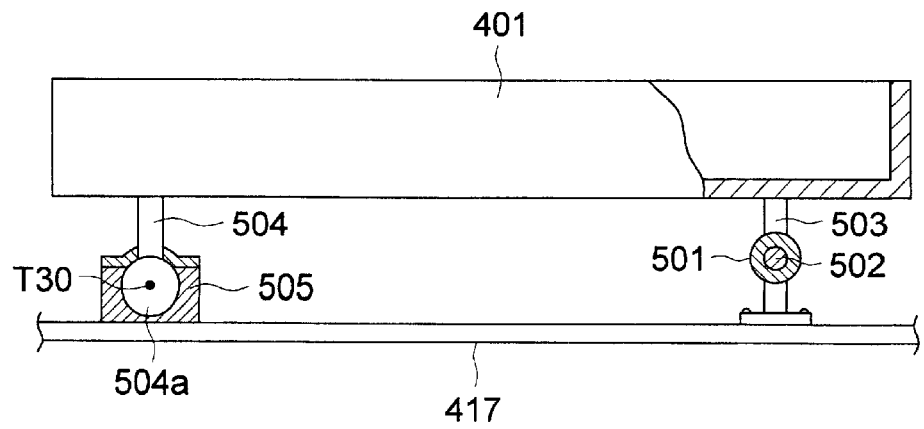

FIG. 12 shows Embodiment 3 of the invention. FIG. 12(a) is a perspective view of exposure unit 30 that is viewed from the lower portion obliquely, and FIG. 12(b) is a sectional view of the supporting structure for exposure unit 30.

Frame object 401 of exposure unit 30 is supported on an image forming apparatus by connecting member 500 having on its tip portion a spherical body supported by an unillustrated spherical body bearing, and is supported by supporting bar 502 having a form along a circular arc whose center is in the position of third supporting point T30. Namely, the supporting bar 502 is inserted through guide member 501 made of circular-arc-shaped tube that is fixed on frame object 401 by supporting member 503. Owing to an unillustrated driving means, frame object 401 is guided by guide member 50 representing a second supporting means to rotate on third supporting point T30 representing a supporting point as shown with arrow V, and thereby, variation of magnification of a scanning optical system of exposure unit 30 in the primary scanning direction is corrected. In this way, the driving means, supporting bar 502 and guide member 501 constitute a magnification adjustment means. The frame object 401 is supported rotatably in the vertical and horizontal directions by connecting member 500 serving as the first supporting means that forms third supporting point T30 and by spherical body bearing 505.

Embodiment 4

Figure 13:
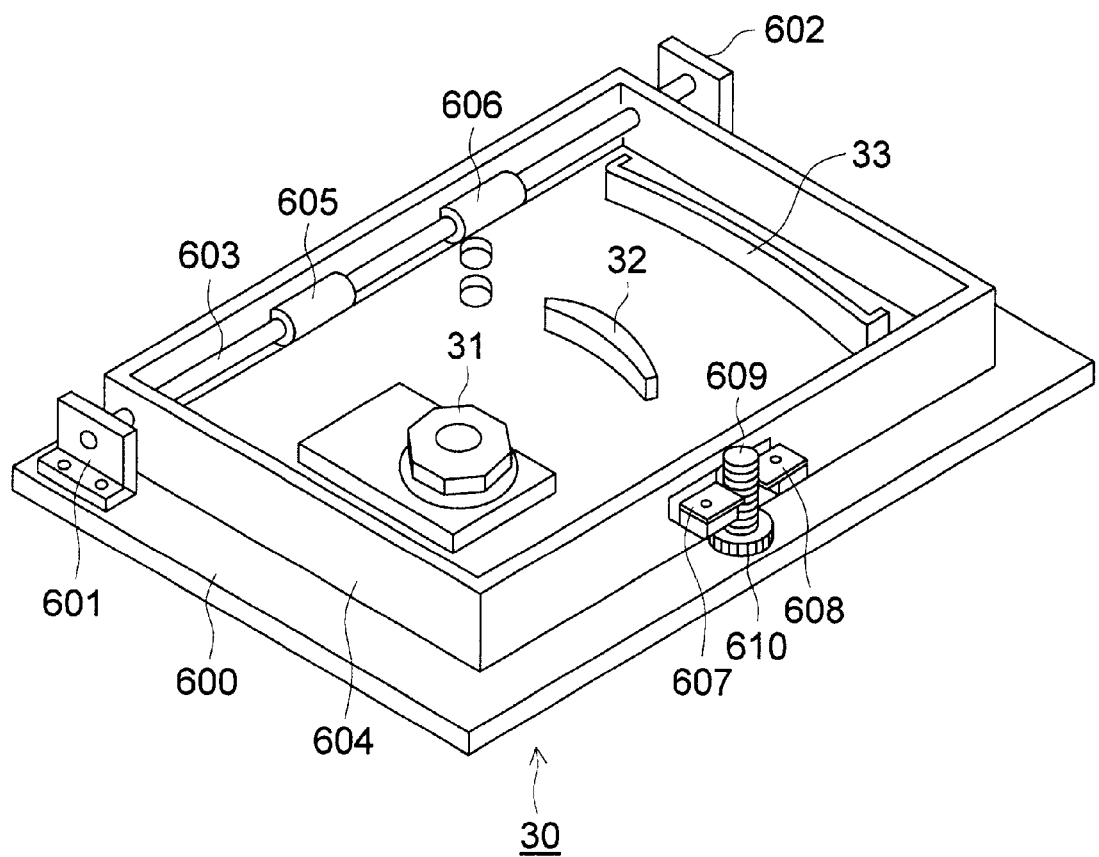
FIG. 13 a diagram showing a supporting section of an exposure unit of an image forming apparatus related to Embodiment 4 of the invention.

FIG. 13 is a perspective view of an exposure unit related to Embodiment 4 of the invention.

Exposure unit 30 has a unit construction assembled on supporting member 600. On lifted portions 601 and 602 both fixed on ends of the supporting member 600, there is supported supporting shaft 603. Tubular connecting members 605 and 606 are engaged rotatably with the supporting shaft 603. The connecting members 605 and 606 are fixed on box-shaped frame object 604. In the frame object 604, there are provided polygon mirror unit 31, fθ lens 32 and second cylindrical lens 33 which constitute a scanning optical system. On the side of the frame object 604 opposite to the side where the connecting members 605 and 606 are provided, there are fixed engagement flakes 607 and 608. The engagement flakes 607 and 608 engage with driving screw 609 that is provided on an image forming apparatus. On the driving screw 609, there is fixed gear 610.

When the driving screw 609 is driven to rotate by a motor representing an un-illustrated driving source, the engagement flakes 607 and 608 act on the frame object 604 to rotate around shaft 603, and thereby, an inclination of exposure unit 30 in the primary scanning direction is adjusted. In this way, the motor, the driving screw 609 and the engagement flakes 607 and 608 constitute an inclination adjustment means.

Though there have been omitted explanations respectively for adjustment of inclination in the primary scanning direction in Embodiment 3 and for correction of variation in magnification in the primary scanning direction in Embodiment 4, it is possible to use adjustment functions in Embodiment 1 and Embodiment 2 or other optional and known adjustment means.

Even by adjusting the whole of the unit in Embodiment 4 with an adjustment mechanism of Embodiment 3, it is also possible to adjust an inclination in the primary scanning direction and to adjust variation of magnification in the primary scanning direction more surely, although more parts are needed.

Though exposure unit 30 having the adjustment mechanism explained above is used in the image forming apparatus shown in FIG. 1, it is further used, without being limited to the image forming apparatus shown in FIG. 1, for an image forming apparatus which will be explained next as Embodiment 5, namely, an image forming apparatus wherein toner images each having a different color are formed on a photoreceptor, and a plurality of color toner images thus formed are transferred onto a recording sheet through an intermediate transfer body, and it is used for an image forming apparatus wherein toner images each having a different color are formed respectively on a plurality of photoreceptors to be superposed successively on a recording sheet to be transferred, or to be superposed successively on an intermediate transfer belt to be transferred collectively on a recording sheet, thus, a full color image is formed.

Embodiment 5

Figure 14:
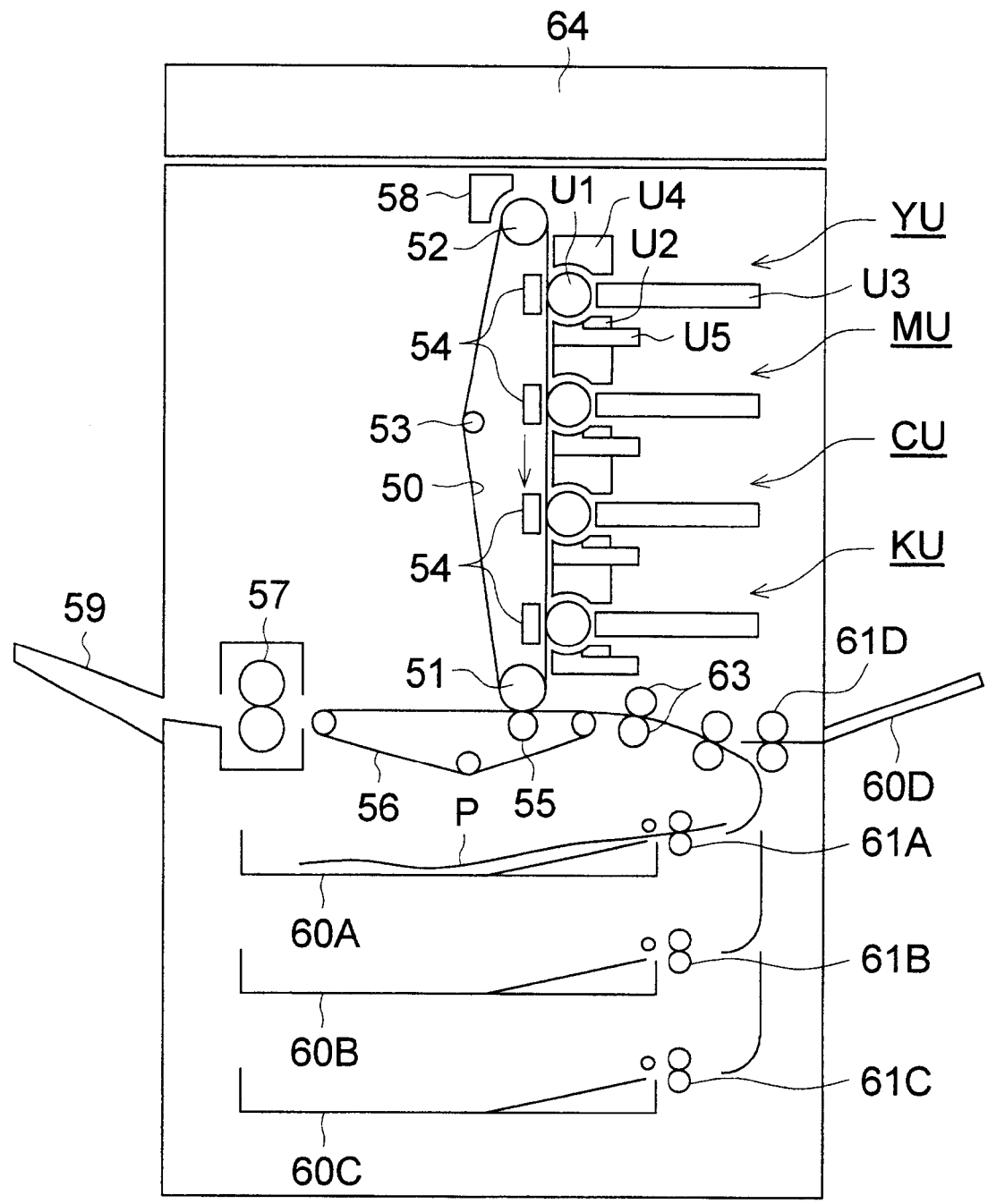
FIG. 14 is a diagram showing the whole of an image forming apparatus related to Embodiment 5 of the invention.

Embodiment 5 will be explained as follows, referring to FIGS. 14–20. FIG. 14 is a diagram showing the whole of an image forming apparatus in Embodiment 5 of the invention, each of FIGS. 15–19 is a diagram showing the connecting structure between exposure units in the image forming apparatus shown in FIG. 14, and FIG. 20 is a diagram showing a detecting means that detects positional relationship between exposure units.

Belt-shaped intermediate transfer object 50 wherein a semiconducting layer is formed on a conductive base is trained about driving roller 51 and driven roller 52 to be tensed appropriately by tension roller 53 so that the intermediate transfer object may be rotated as shown with an arrow. Image forming section YU for a yellow image, image forming section MU for a magenta image, image forming section CU for a cyan image and image forming section KU for a black image are provided to face the intermediate transfer object 50. Each image forming section is provided with cylindrical photoreceptor U1, charging unit U2, exposure unit U3, developing unit U4 and cleaning unit U5. Incidentally, with regard to these structural elements in the aforesaid image forming section, symbols are given only to those in the image forming section for a yellow image. Transfer unit 54 is provided to face each of the image forming sections YU, MU, CU and KU with an inbetween of the intermediate transfer object 50.

Sheet feeding cassettes 60A, 60B and 60C each being loaded with recording sheets are provided at the lower portion of the apparatus, while, manual sheet feeding tray 60D is provided on the side of the apparatus. Sheet feeding sections 61A, 61B, 61C and 61D each feeding out recording sheet P from each of the sheet feeding cassettes and manual sheet feeding tray are provided. Each of the sheet feeding sections 61A, 61B, 61C and 61D is composed of a feed-out roller that feeds out stacked recording sheets in succession from the uppermost sheet, a separation conveyance roller that separates one recording sheet to convey it and of a fanning roller. The numeral 56 is a conveyance belt that conveys recording sheet P to fixing unit 57, the numeral 57 is a fixing unit having therein a heat roller and a pressure roller, the numeral 58 is a cleaning unit that removes remaining toner on the intermediate transfer object 50, the numeral 59 is a sheet ejection tray and the numeral 64 is a reading unit that reads a document and generates image data.

In each image forming section, a toner image is formed on photoreceptor U1 through charging by charging unit U2, exposure by exposure unit U3 and development by developing unit U4. With regard to formation of these toner images, transfer is made by transfer unit 54 on intermediate transfer body 50, and each toner image is controlled to be formed so that toner images are superposed on the intermediate transfer body 50 and a full color image may be formed.

A full color image formed on the intermediate transfer body 50 is transferred onto recording sheet P by transfer unit 55, and is fixed by fixing unit 57. Recording sheet P on which a full color image is formed is ejected to sheet ejection tray 59.

Each of image forming sections YU, MU, CU and KU is required to form a toner image of each color on intermediate transfer body 50 at the accuracy of a unit of micron. When this condition is not satisfied, a full color image formed on the intermediate transfer body 50 cannot avoid doubling. Therefore, positions of the image forming sections YU, MU, CU and KU, in particular, the relational position between exposure units U3 of the units is required to be established highly accurately.

Figure 15:
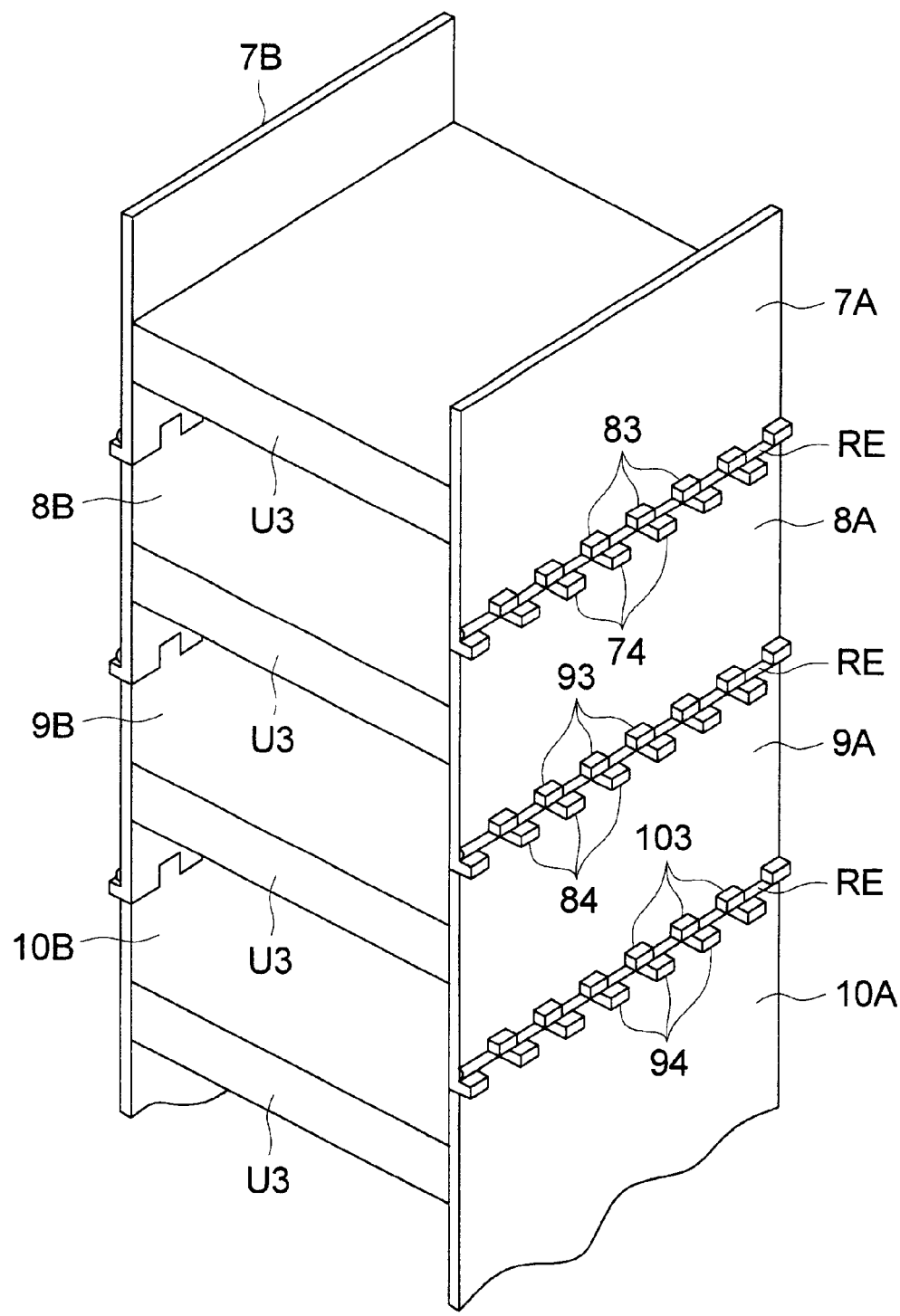
FIG. 15 is a perspective view showing the combination structure between exposure units in Embodiment 5 of the invention.

In the present embodiment, exposure units U3 of the image forming sections YU, MU, CU and KU, namely, four exposure units are connected vertically, as shown in FIG. 15. As shown in FIG. 15, exposure unit U3 for yellow images is fixed, at its both ends, on supporting plates 7A and 7B representing a supporting means, exposure unit U3 for magenta images is fixed on supporting plates 8A and 8B representing a supporting means, exposure unit U3 for cyan images is fixed on supporting plates 9A and 9B representing a supporting means, and exposure unit U3 for black images is fixed on supporting plates 10A and 10B representing a supporting means, while, supporting plates 7A and 8A, supporting plates 8A and 9A, supporting plates 9A and 8A, supporting plates 7B and 8B, supporting plates 8B and 9B and supporting plates 9B and 10B are mutually connected and fixed.

Figure 16:
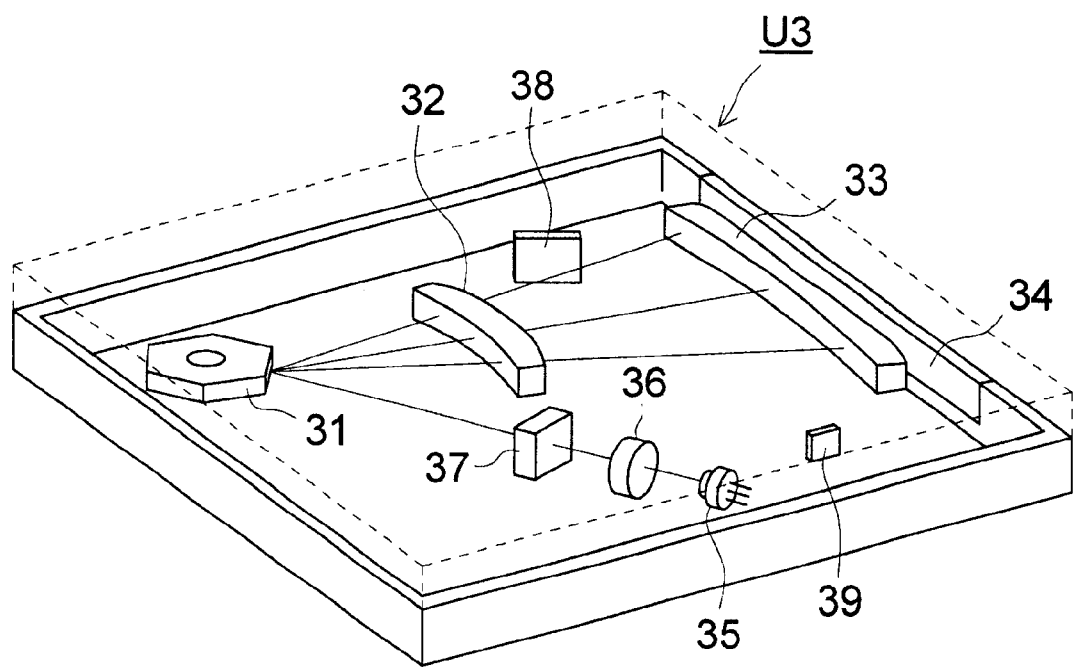
FIG. 16 is an exploded perspective view of an exposure unit.

As shown in FIG. 16, exposure unit U3 has therein Semiconductor laser 35 representing a light source and an optical system composed of collimator lens 36, first cylindrical lens 37, polygon mirror unit 31, fθ lens 32 and second cylindrical lens 33. The numeral 39 represents an index sensor, and 38 represents a mirror that guides a light beam to the index sensor 39.

Figure 17:
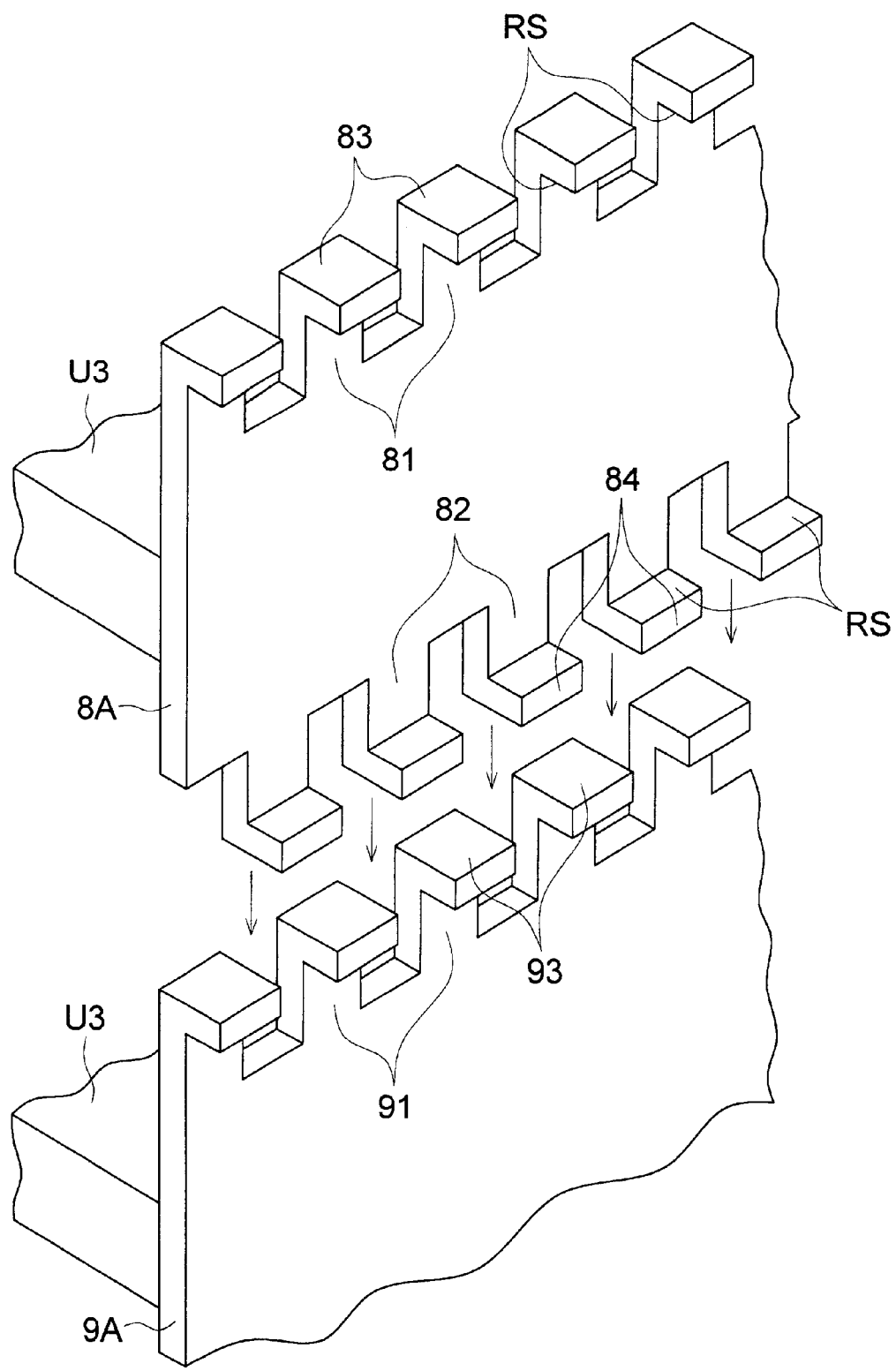
FIG. 17 is a diagram showing the process of combination between exposure units.
Figure 18:
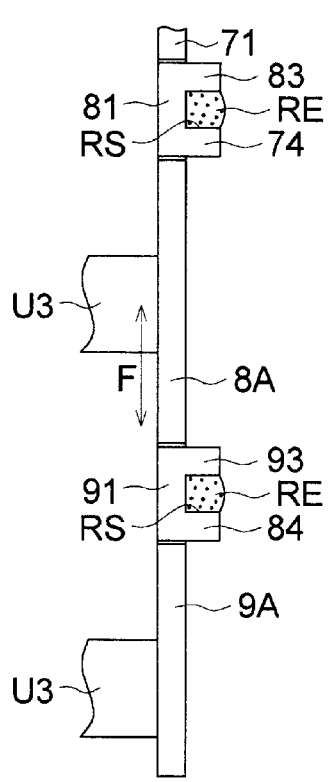
FIG. 18 is a diagram showing an example of a combination section between exposure units.
Figure 18:
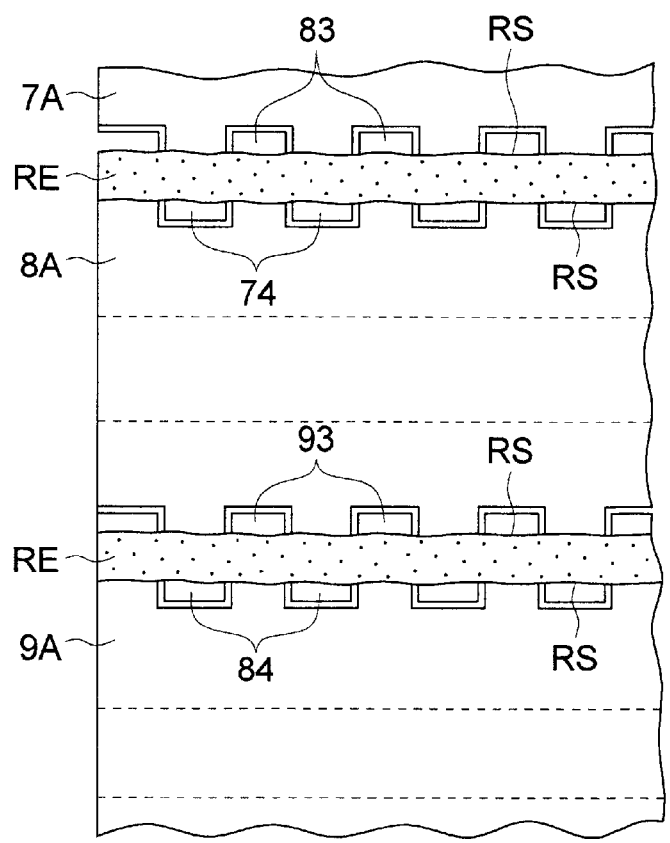

The supporting plates 7A, 7B, 8A, 8B, 9A, 9B, 10A and 10B each having many protrusions are combined with each other through a fixing means in which each supporting plate is fixed to the other with these protrusions interlocked each other. Each of FIGS. 17 and 18 shows an example of a combination of supporting plates 8A and 9A. FIG. 17 shows how these supporting plates are positioned before they are combined, and FIG. 18 shows how the supporting plates are positioned after they are combined. Image forming sections YU, MU, CU and KU are in the state wherein the image forming sections YU, MU and CU are adjusted to their desired positions by an unillustrated image forming section positioning means, with the image forming section KU serving as a standard. Under the state where positions of the image forming sections have been adjusted, each image forming section is made by an unillustrated adjusting means to be floating in the air, and each of mutual clearances of the aforesaid many protrusions has sufficient space including a margin for adjustment in the course of an adjusting step. With many protrusions stated above which are fixed with each other by a connecting means described later, the image forming sections YU, MU, CU and KU are constituted as a large image forming unit.

FIG. 18(a) is a side view of the combined portion, and FIG. 18(b) is a front view of the combined portion. As shown in FIG. 17, protrusion 82 of supporting plate 8A is interlocked with protrusion 91 of supporting plate 9A alternately. The protrusions 82 and 91 respectively have bent portions 84 and 93 at their tip portions, and after the supporting plate 8A and the supporting plate 9A are combined, resins RE are filled in a gap between the bent portions 84 and 93 by injecting melted resins RE as shown in FIG. 18. The combined portion where resins RE are filled is in the state shown in FIG. 18 wherein the supporting plates 8A and 9A are combined firmly by resisting power of resin RE itself acting on force in the direction F to draw the supporting plates apart, because resins RE are filled in a gap between the bent portions 93 and 84 each having surface RS that crosses direction F to draw the supporting plates 8A and 9A apart.

Supporting plate 7A is combined with supporting plate 8A, supporting plate 9A is combined with supporting plate 10A, supporting plate 7B is combined with supporting plate 8B, supporting plate 8B is combined with supporting plate 9B, and supporting plate 9B is combined with supporting plate 10B, all in the same way as in the foregoing to fill resins RE by injecting them.

In the aforesaid way, four exposure units U3 are combined firmly with each other.

FIG. 19 shows another example of combination of exposure units. In this example, bent portions are not provided on many protrusions provided on each of supporting plates 7A, 8A, 9A and 10A, which is different from the occasion in FIGS. 17 and 18.

In the example shown in FIG. 19, after adjoining supporting plates of exposure units such as supporting plates 7A and 8A and supporting plates 8A and 9A are combined, resins RE are injected in the combined portion so that both of them are combined and fixed. In this case, resin materials which are of the same type as that of resins forming the supporting plates 7A and 8A are used as resin RE. The same resin materials used for the supporting plate and for resin RE to be filled make the coefficients of linear expansion for them to be the same, resulting in prevention of a strain of the image forming section caused by temperature rise in an image forming apparatus. When filling melted resins in a gap, a portion on each of supporting plates 7A, 7B, 8A, 8B, 9A, 9B, 10A and 10B where resins are filled is affected by heat and its surface is roughened, which makes the supporting plates to be combined more firmly, compared with a combining method which does not apply heat.

Adjoining supporting plates other than the supporting plates 7A, 8A and 9A are also combined in the same way.

Incidentally, the combining structure between exposure units in the present embodiment can naturally be applied also to combination for exposure units 30, 30M, 30C and 30K in FIG. 1.

To improve image quality for a color image forming apparatus, it is necessary to assemble after adjusting positions accurately for exposure units U3 respectively of image forming sections YU, MU, CU and KU. In the present embodiment, the assembled body shown in FIG. 15 is assembled through the steps explained below.

First, supporting plates 7A, 7B, 8A, 8B, 9A, 9B, 10A and 10B are fixed on exposure units U3. The exposure unit U3 on which the lowermost supporting plates 10A and 10B are attached is fixed to a jig with an unillustrated attaching standard. Other exposure units U3 are stacked in succession from the bottom, and the exposure units other than the lowermost one are held by an arm of an unillustrated jig to be kept in the state of floating. Next, for the lowermost exposure unit, other exposure units are adjusted in terms of position so that they may be within a range of design values. The adjustment is made by measuring the distance between exposure units U3 accurately.

Melted resins RE are poured into a gap formed between the aforesaid supporting plates whose positions have been adjusted, and the supporting plates are fixed.

As shown in FIG. 20, on intermediate transfer body 50 trained about driving roller 51, driven rollers 52 and 53, there are formed, through exposure of fixed pattern by exposure unit U3, many marks ML, MC and MR each being in a shape of "inverted L" for position adjustment. Marks ML are formed on the left end portion, marks MC are formed on the central portion and marks MR are formed on the central portion, all of photoreceptor 50. Each mark has a shape of "inverted L" composed of a segment being in parallel with primary scanning line SL and a segment crossing the primary scanning line SL at an angle of 45°.

Information of position detection for the segment being in parallel is used for adjusting a position of each exposure unit U3 for each of image forming sections YU, MU, CU and KU, and information of position detection for the segment crossing the primary scanning line is used for adjusting a position of each exposure unit U3 in the primary scanning direction and for adjusting magnification in the primary scanning direction. Positions of marks SSL, SSCL and SSR are detected by sensor SS. The sensor SS is composed of light-projecting element SS1 of the LED construction which projects a light beam on photoreceptor 50, light-receiving element SS2 that receives reflected light from photoreceptor 50 and lens SS3.

Adjustment of positions between exposure units employing a position detecting means shown in FIG. 20 is conducted through image forming tests operating an image forming apparatus in which the assembled body shown in FIG. 15 is incorporated.

Owing to the assembling steps for an image forming apparatus stated above, there is formed an image forming apparatus capable of forming a color image with high image quality which has neither position shifting in the primary scanning direction nor position shifting in the sub-scanning direction for image forming sections YU, MU, CU and KU, and is free from inclination of the primary scanning line and from variation o magnification in the primary scanning direction.

Structure 1 makes it possible to adjust an inclination in the primary scanning direction with a high precision under the simple supporting structure and through easy adjustment operation, and thereby to realize an image forming apparatus offering high image quality.

Structure 2 makes it possible to adjust variation of magnification in the primary scanning direction with a high precision under the simple supporting structure and through easy adjustment operation, and thereby to realize an image forming apparatus offering high image quality.

Structure 3 makes it possible to adjust an inclination in the primary scanning direction and variation of magnification in the primary scanning direction with a high precision under the simple supporting structure and through easy adjustment operation, and thereby to realize an image forming apparatus offering high image quality.

Either one of Structures 4–8 makes it possible to adjust a scanning optical system easily and accurately in less adjustment frequency.

Either one of Structures 9–12 makes it possible to adjust more precisely with less amount of adjustment, because the adjustment is conducted, centering almost around an optical axis of a scanning optical system.

Either one of Structures 13–16 makes it possible to realize a supporting structure wherein positional shifting caused by rotation is extremely limited, as a spherical body bearing that supports an exposure unit rotatably in all directions, and thereby, an adjustment with a high precision is possible, and an adjustment value can be maintained for a long time.

Either one of Structures 17–29 makes it possible to realize an adjustment means at a high precision in the case of assembling various members such as a driving screw, an engagement flake and an engagement block for constituting the adjustment means, without requirement of a high assembling precision.

Either one of Structures 30–32 makes it possible to realize a color image forming apparatus offering high image quality.

Either one of Structures 27–34 makes it possible to adjust extremely accurately.

Structure 35 makes it possible to adjust, with a high precision, a variation of magnification in the primary scanning direction with a simple adjusting means.

Structure 36 makes it possible to adjust, with a high precision, an inclination in the primary scanning direction with a simple adjusting means.

Structures 37–44 make it possible to realize an image forming apparatus wherein no position shifting is caused between plural exposure units and to realize an image forming apparatus wherein images of high image quality can be formed for a long time.

Hereinunder, are detailed descriptions of the other embodiments.

As a color image forming apparatus employing the scanning optical device of the invention, there is used a color image forming apparatus of a tandem type wherein toner images which are formed respectively on a plurality of image carriers to be composed respectively of yellow (Y) toner, magenta (M) toner, cyan (C) toner and black (K) toner are formed, and the toner images thus formed on the plural image carriers are superposed on a transfer material through an intermediate transfer body, or directly.

Figure 21:
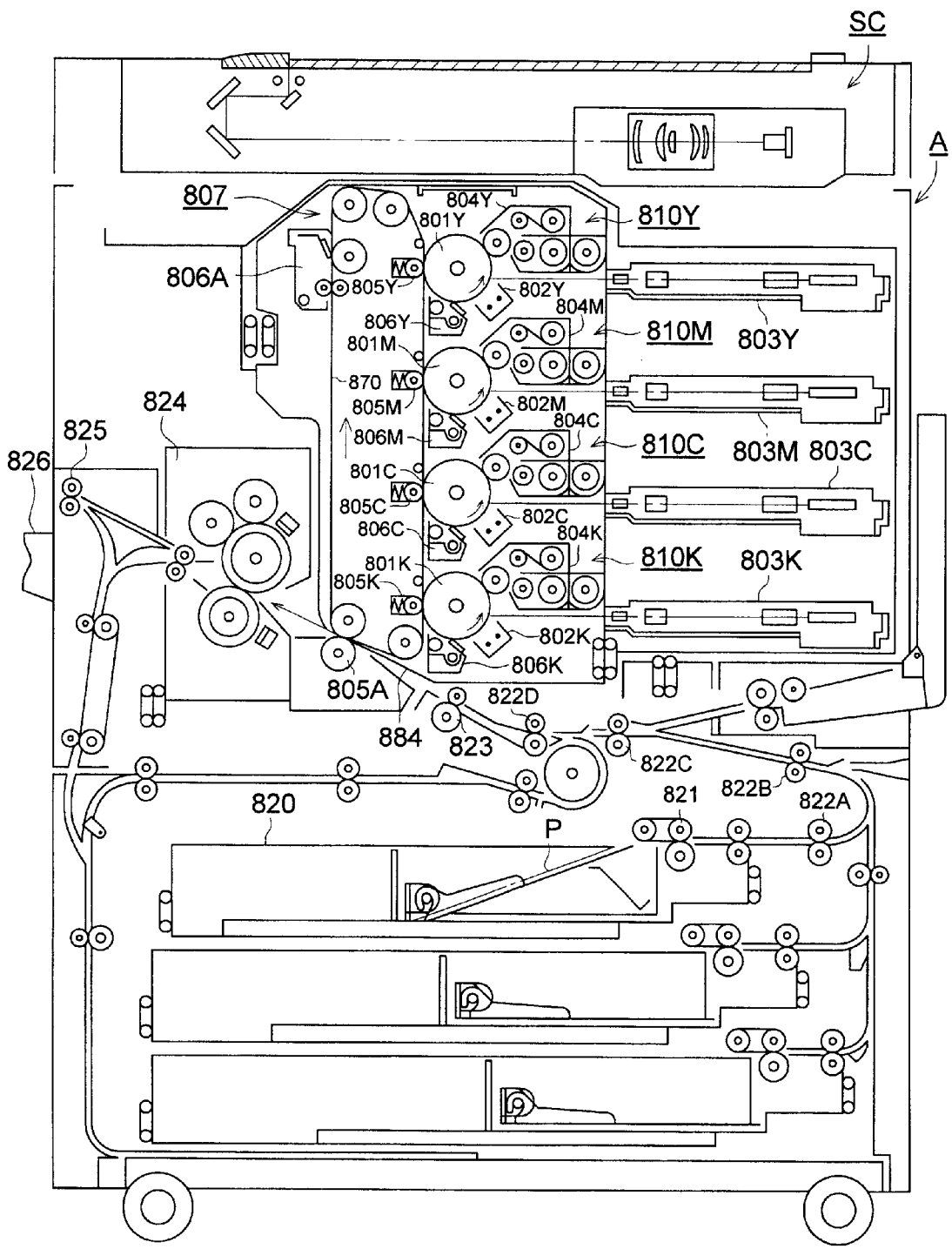
FIG. 21 is a sectional structure diagram of a color image forming apparatus.

The color image forming apparatus shown in FIG. 21 is called a color image forming apparatus of a tandem type wherein the scanning optical device of the invention is used as an exposure means, and toner images formed on image carriers are transferred onto an intermediate transfer body to be superposed, and then, the superposed toner images are transferred collectively, and the color image forming apparatus is composed of plural sets of image forming sections 810M, 810M, 810C and 810K, intermediate transfer unit 807, a sheet conveyance means and fixing means 824. On the top portion of image forming apparatus main body (hereinafter referred to as an apparatus main body) A, there is arranged document image reading device SC.

Image forming section 810Y that forms a yellow image has therein charging means 802Y, exposure means 803Y, developing means 804Y, primary transfer means 805Y and cleaning means 806Y, all arranged around image carrier (photoreceptor) 801Y. Image forming section 810M that forms a magenta image has therein image carrier (photoreceptor) 801M, charging means 802M, exposure means 803M, developing means 804M, primary transfer means 805M and cleaning means 806M. Image forming section 810C that forms a cyan image has therein image carrier (photoreceptor) 801C, charging means 802C, exposure means 803C, developing means 804C, primary transfer means 805C and cleaning means 806C. Image forming section 810K that forms a black image has therein image carrier (photoreceptor) 801K, charging means 802K, exposure means 803K, developing means 804K, primary transfer means 805K and cleaning means 806K. On the image forming section 810, there are conducted charging, exposure and development, so that images each being of a different color are formed on image carrier 801.

Intermediate transfer unit 807 has therein semiconducting endless-belt-shaped intermediate transfer body 870 that is trained about a plurality of rollers and is supported rotatably.

Images each being of a different color formed by image forming sections 810Y, 810M, 810C and 810K are transferred, in synchronization, by primary transfer means 805Y, 805M, 805C and 805K onto rotating intermediate transfer body 870 successively to be superposed, thus, a composite color image is formed. Recording medium (hereinafter referred to as sheet) P loaded in sheet feeding cassette 820 is fed by sheet feeding means 821 to be conveyed, through a plurality of intermediate rollers 822A, 822B, 822C and 822D and registration roller 823, to secondary transfer means 805A where superposed color images are transferred collectively on sheet P. The sheet P on which the color images have been transferred is fixed by fixing means 824, and is interposed by sheet ejection rollers 825 to be placed on sheet ejection tray 826 that is located outside the apparatus.

On the other hand, after color images are transferred on sheet P by secondary transfer means 805K, the sheet P is curvature-separated from intermediate transfer body 870, and toner remaining on the intermediate transfer body 870 is removed by cleaning means 806A.

In the course of image forming processing, the primary transfer means 805K is in pressure contact with photoreceptor 801K constantly. Other primary transfer means 805Y, 805M and 805C are respectively in pressure contact with their corresponding photoreceptors 801Y, 801M and 801C only when color images are formed.

Secondary transfer means 805A is in pressure contact with intermediate transfer body 870 only when the sheet P passes through the secondary transfer means so that secondary transfer is conducted.

Figure 22:
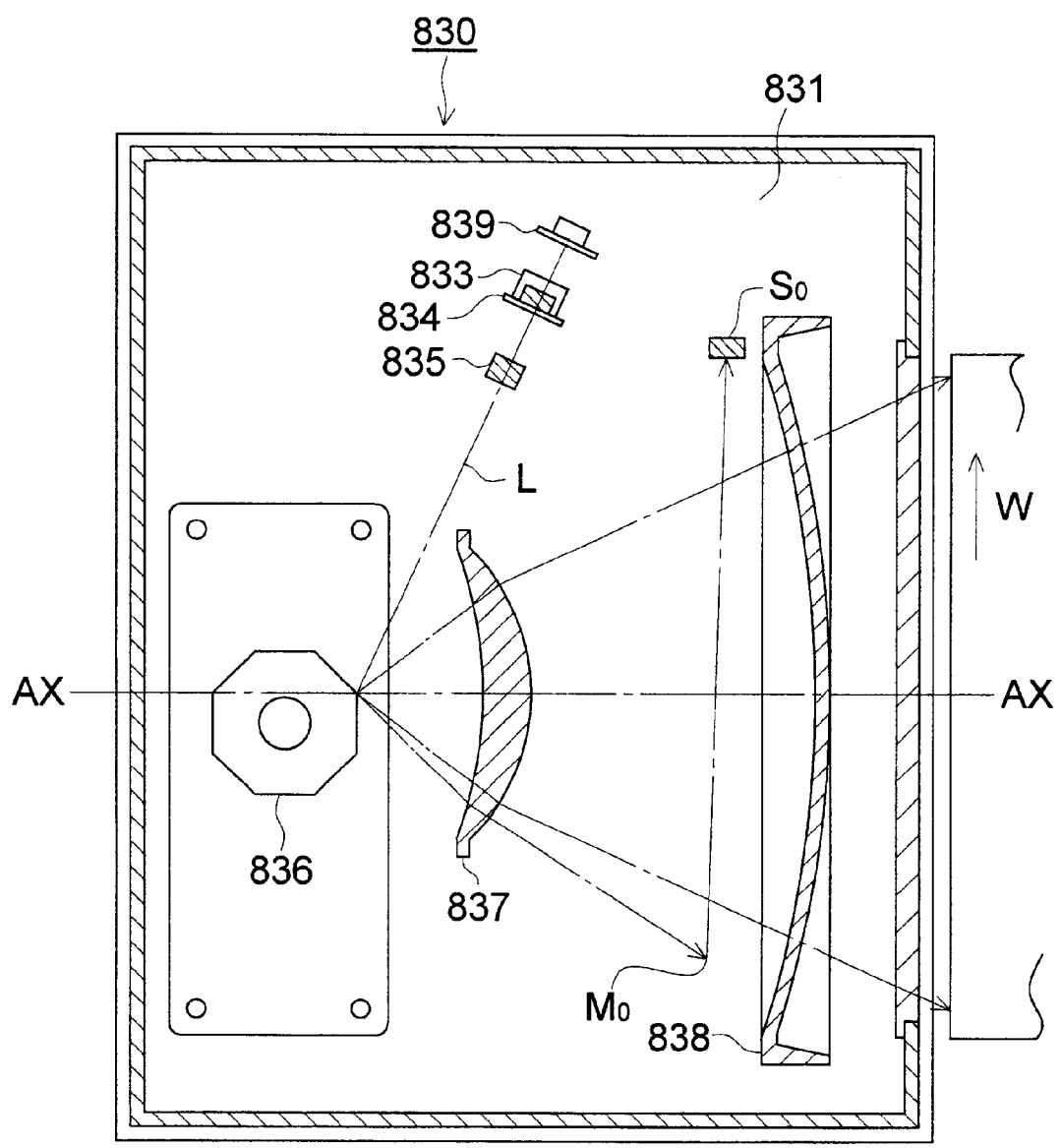
FIG. 22 is a structure diagram of a scanning optical device.

An exposure means used for the color image forming apparatus in FIG. 21 will be explained next. FIG. 22 shows a scanning optical device representing an exposure means, and scanning optical device 803Y will be explained as an example, because scanning optical devices 803Y, 803M, 803C and 803K each representing an exposure means are the same in terms of mechanism. On scanning optical device main body 831 formed on the scanning optical device 803Y, there are fixed optical parts and others. With regard to the scanning optical device, divergent light emitted from semiconductor laser light source device 839 is collimated by collimator lens 833. A section of the collimated light is formed by aperture-stop 834, and it is converged, only in the sub-scanning direction, by first cylindrical lens 835 having power only in the sub-scanning direction, then, it passes through second cylindrical lens 838 that corrects inclination of deflector 836 to be converged on the surface to be scanned as a light spot which scans on the surface to be scanned in the W direction at a constant speed through deflector 836 and fθ lens 837.

$S_0$ represents an optical synchronization sensor, and it detects (optical synchronization detection) a light beam that is reflected by mirror $M_0$ and enters optical synchronization sensor $S_0$ to be deflected and to scan, and then, it starts writing after a certain period of time. Thus, there is conducted optical synchronization wherein each toner image of a color image in the primary scanning direction agrees in terms of position with other toner images.

Embodiment 6

Figure 23:
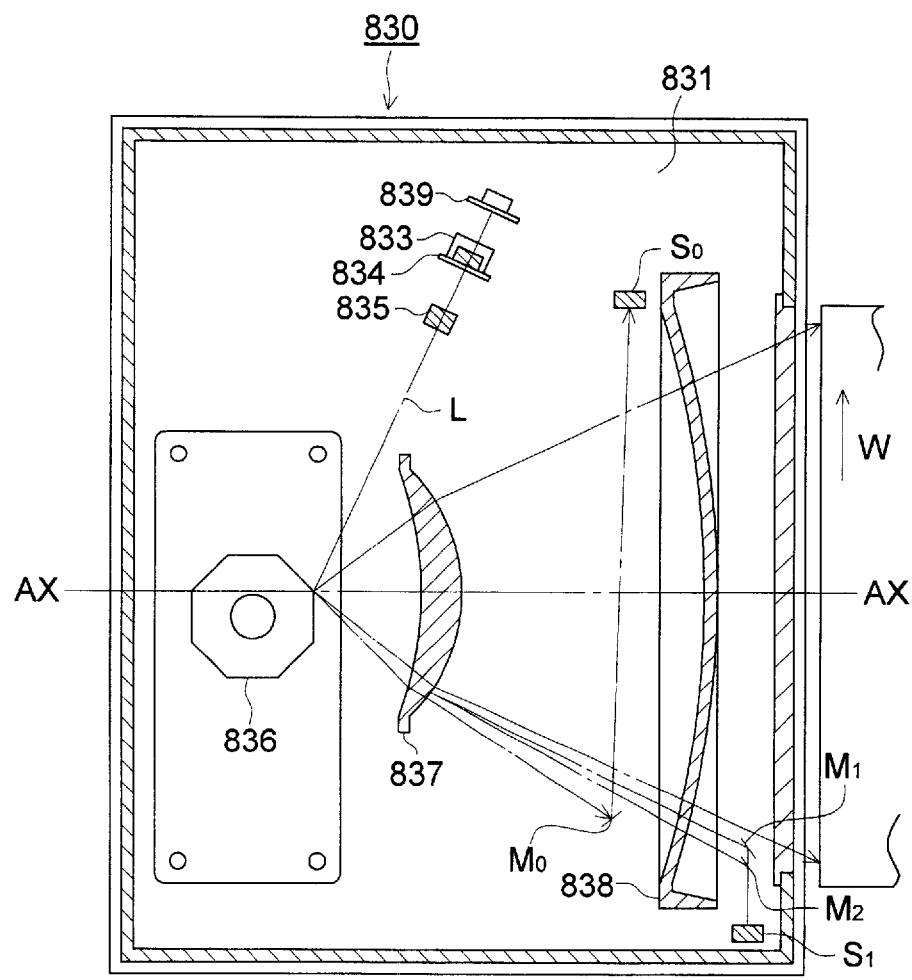
FIG. 23 shows a plan view, an illustration and a timing chart in the example of the invention.
Figure 23:
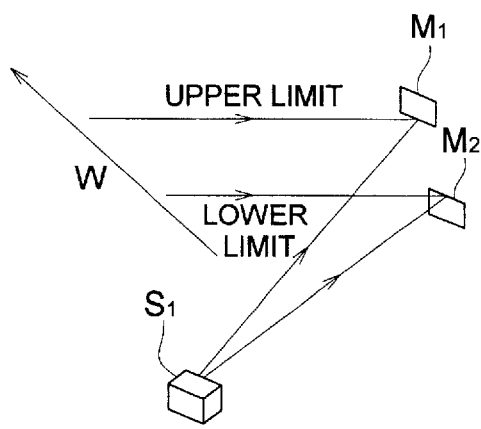
Figure 23:
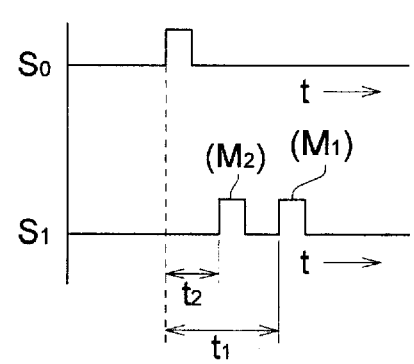

Embodiment 6 will be explained as follows, referring to a top view, an illustration and a timing chart shown in FIG. 23.

The scanning optical device shown in the present example is arranged to be movable around a point in the vicinity of an optical axis of the second cylindrical lens 838, that point serving as a rotation center, and when one end of the second cylindrical lens 838 is moved upward or downward, an inclination of a deflected scanning line emitted from deflector 836 and fθ lens 837 is changed.

In the present example, detection sensor $S_1$ representing a detection means detects that a light beam passing through the second cylindrical lens 838 has arrived at an upper limit position or a lower limit position to be allowed, and its arrangement is shown in FIG. 23(a). Namely, upper limit detection mirror $M_1$ and lower limit detection mirror $M_2$ for detecting respectively the upper limit position and the lower limit position to be allowed are arranged to be shifted each other in the optical scanning direction, between an incidence position to optical synchronization sensor $S_0$ for a light beam passing through the second cylindrical lens 838 and a position to start writing.

The upper limit detection mirror $M_1$ arranged reflects a light beam when the upper limit position is exceeded by the light beam, and the reflected light enters detection sensor $S_1$. The lower limit detection mirror $M_2$ arranged reflects a light beam when the lower limit position is exceeded by the light beam, and the reflected light enters detection sensor $S_1$. When a light beam exceeds the allowable upper limit or lower limit, the detection sensor $S_1$ detects that the light beam has arrived at an allowable limit.

With regard to judgment about whether the limit value of the light beam detected by the detection sensor $S_1$ is an upper limit or a lower limit, if the detection sensor $S_1$ detects that a light beam has arrived at the limit value, after $t_1$ sec, for example, from optical synchronization detection of the light beam conducted by optical synchronization sensor $S_0$, as shown in FIGS. 23(b) and 23(c), there is made judgment that arrival at the upper limit has been detected. On the other hand, if the detection sensor $S_1$ detects that a light beam has arrived at the limit value, after $t_2$ sec, for example, from optical synchronization detection, there is made judgment that arrival at the lower limit has been detected.

In the present example, the upper limit detection mirror $M_1$ and the lower limit detection mirror $M_2$ are arranged to be shifted each other in the optical scanning direction. Therefore, the allowable upper limit and the lower limit of a light beam can easily be detected by a single piece of detection sensor $S_1$, and a device to detect the upper limit and lower limit can be simplified.

Embodiment 7

Figure 24:
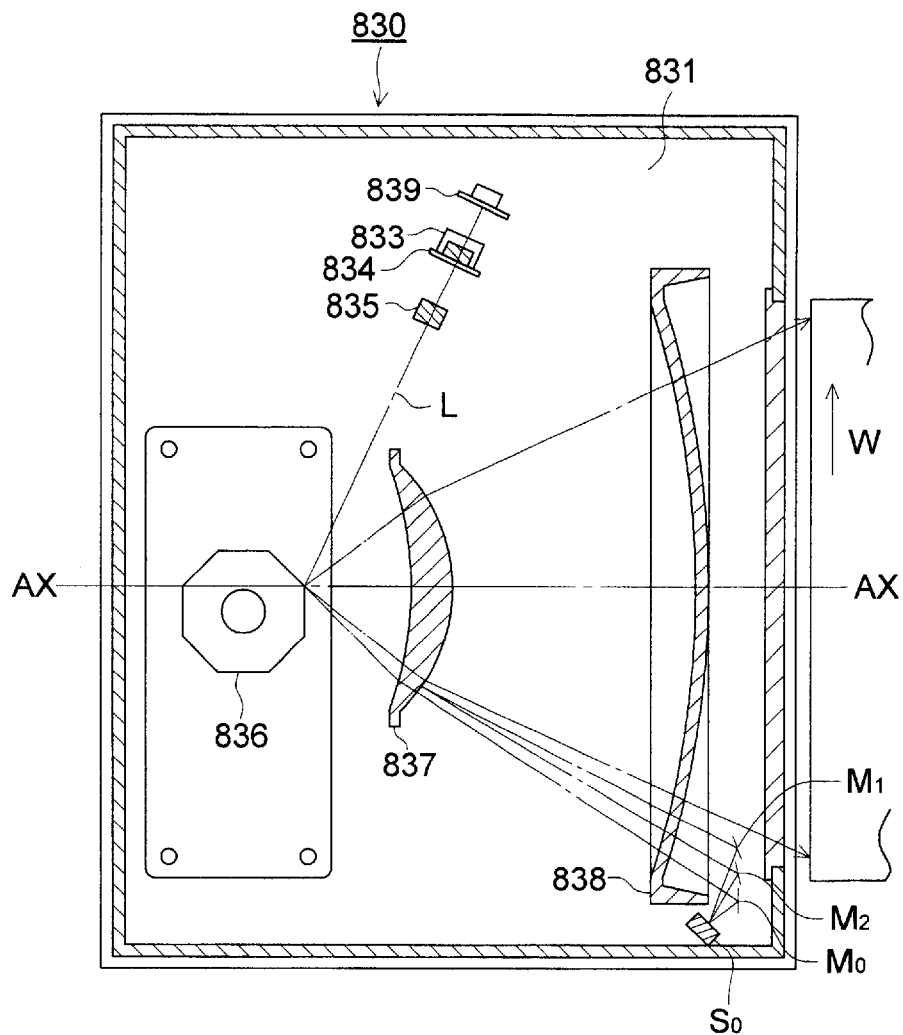
FIG. 24 shows a plan view, an illustration and a timing chart in the example of the invention.
Figure 24:
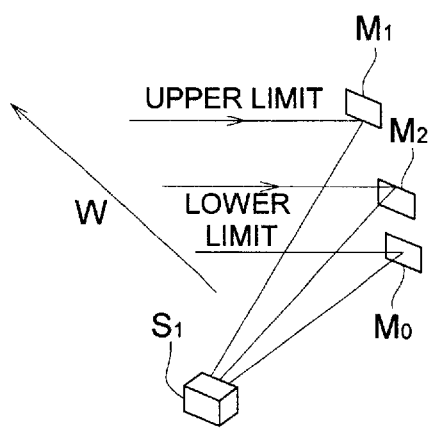
Figure 24:
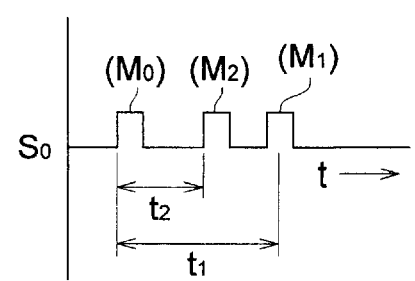

Embodiment 7 will be explained as follows, referring to a top view, an illustration and a timing chart shown in FIG. 24.

The scanning optical device shown in the present example is arranged to be movable around a point in the vicinity of an optical axis center of the second cylindrical lens 838 serving as a center of oscillation, and when one end of the second cylindrical lens 838 is moved upward or downward, an inclination of a deflected scanning line emitted from deflector 836 and fθ lens 837 is changed.

In the present example, optical synchronization sensor $S_0$ conducts optical synchronization detection for scanning light passing through the second cylindrical lens 838, and it detects that the light beam passing through the second cylindrical lens 838 has arrived at the allowable upper limit position or lower limit position and its arrangement is shown in FIG. 24(a). Namely, upper limit detection mirror $M_1$ and lower limit detection mirror $M_2$ for detecting respectively the upper limit position and the lower limit position to be allowed are arranged to be shifted each other in the optical scanning direction, between an incidence position to optical synchronization sensor $S_0$ for a light beam passing through the second cylindrical lens 838 and a position for writing.

The upper limit detection mirror $M_1$ arranged reflects a light beam when the upper limit position is exceeded by the light beam, and the reflected light enters optical synchronization sensor $S_0$. The lower limit detection mirror $M_2$ arranged reflects a light beam when the lower limit position is exceeded by the light beam, and the reflected light enters optical synchronization sensor $S_0$. The optical synchronization sensor $S_0$ detects optical synchronization and detects that the light beam has arrived at an allowable limit of the upper limit or the lower limit.

With regard to judgment about whether the limit value of the light beam detected by the optical synchronization sensor $S_0$ is an upper limit or a lower limit, if the arrival at the limit value is detected after $t_1$ sec, for example, after optical synchronization detection of a light beam is conducted by optical synchronization sensor $S_0$ as shown in FIGS. 24(b) and 24(c), there is made judgment that arrival at the upper limit has been detected. On the other hand, if the limit value is arrived, after $t_2$ sec, for example, from optical synchronization detection, there is made judgment that arrival at the lower limit has been detected.

In the present example, the upper limit detection mirror $M_1$ and the lower limit detection mirror $M_2$ are arranged to be shifted each other in the optical scanning direction, and an arrangement is made so that reflected lights from these mirrors may enter optical synchronization sensor $S_0$ that conducts optical synchronization. Therefore, sensors for detecting the upper limit and the lower limit are not needed, and detection for the upper limit and the lower limit is simplified and is made to be easy.

Embodiment 8

Figure 25:
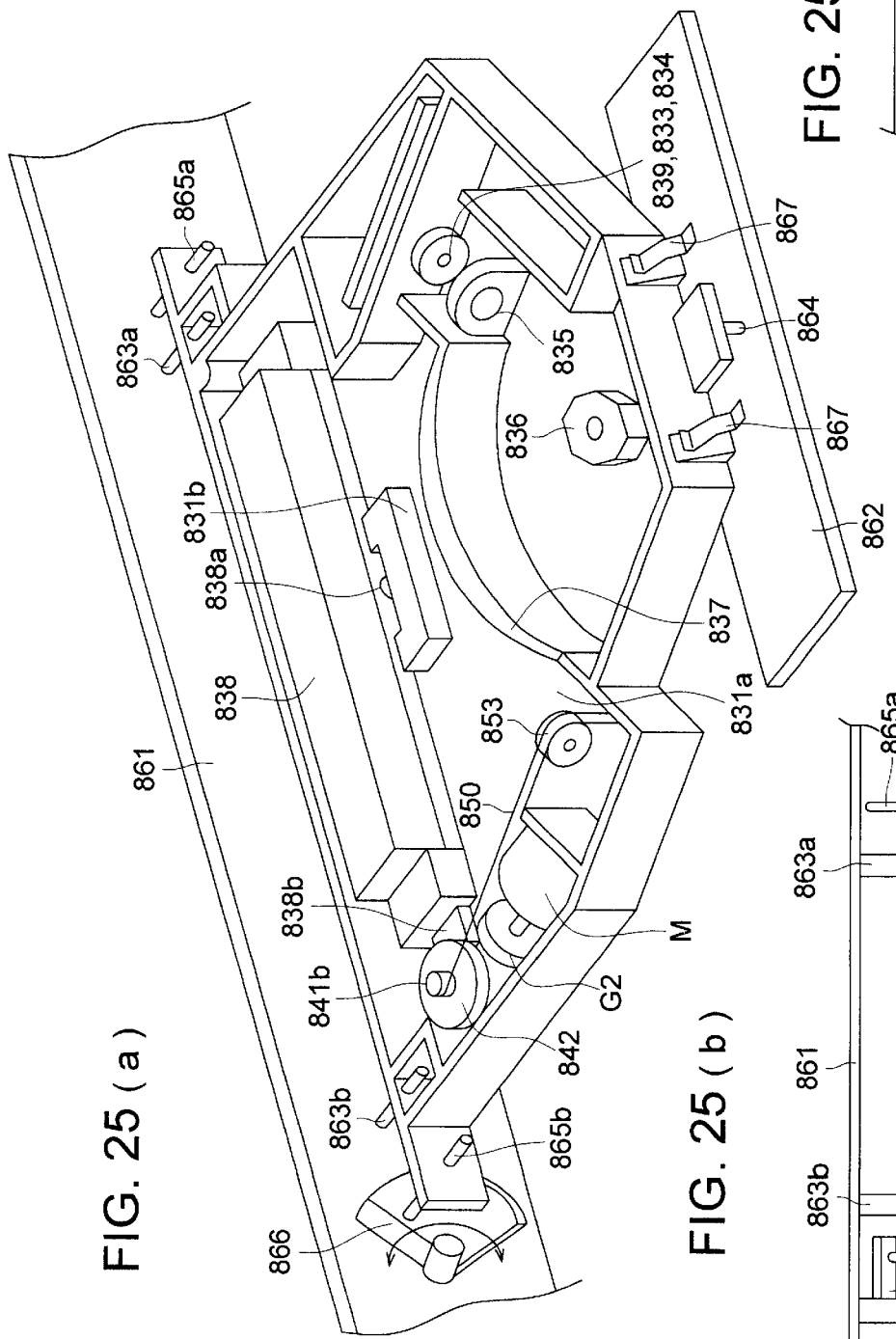
FIG. 25 is a perspective view of a scanning optical device, and sectional side views of essential portions showing examples of the invention.
Figure 25:
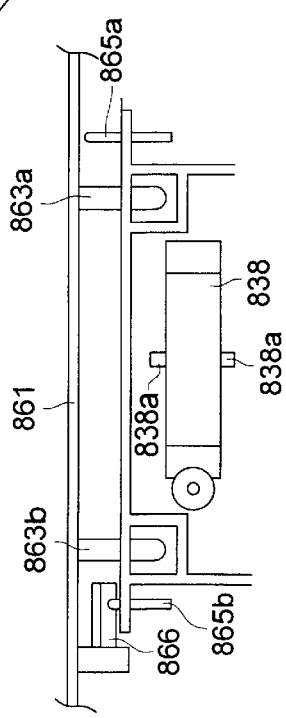
Figure 25:
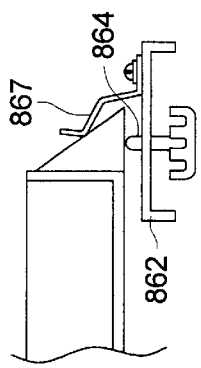

Embodiment 8 will be explained as follows, referring to FIGS. 25–27.

On the scanning optical device shown in the present example, there is provided second cylindrical lens 838 representing a movable optical element. The second cylindrical lens 838 is arranged to be movable around a point in the vicinity of its optical axis center serving as a center of oscillation, and when one end of the second cylindrical lens 838 is moved upward or downward, an inclination of a deflected scanning line which has been deflected by the deflector 836 and passed through fθ lens 837 is changed.

The present example is arranged to be of the structure to move one end of the second cylindrical lens 838 upward or downward by rotating a movable shaft provided in that structure, wherein a wire that is stretched by a spring is wound around the rotatable shaft, and a wire position detecting means that detects a position of the wire is provided along the stretched wire, so that the upper limit or the lower limit of the movement of the second cylindrical lens 838 may be detected by detecting the position of the wire. FIG. 25(*a*) is a perspective view of the scanning optical device of the present example, and FIG. 26 shows primary portions of the present example. Incidentally, FIG. 26(*a*) is a side view of the primary portions of the present example, FIG. 26(*b*) is a top view of the primary portions and FIG. 26(*c*) is a side view of the primary portions.

On the second cylindrical lens 838, there is provided, in the vicinity of the optical axis center, center shaft 838*a* serving as the center of oscillation, and the center shaft 838*a* is placed on V-shaped supporting shaft section 831*b* provided on base board 831*a* of the scanning optical device main body 831 to be pressed downward by elasticity of blade spring member 831*c*, thus, the second cylindrical lens 838 is capable of oscillating around the center shaft 838*a* that serves as the center of oscillation. An inclination of the deflected scanning line is changed by oscillation of the second cylindrical lens 838.

On the base board 831*a*, there is attached rotary shaft 841 that is rotatable. The rotary shaft 841 has male screw portion 841*a* and has, on its tip portion, cylindrical wire winding section 841*b* on which wire 850 is wound and worm gear 842 is mounted solidly.

On the male screw portion 841*a* of the rotary shaft 841, there is mounted, on a screw-engagement basis, nut member 843 which is composed of two disc-shaped members located at the upper and lower portions and a female screw portion located at the central portion and has a horizontal-H-shaped sectional view.

Side end portion 838*b* of the second cylindrical lens 838 is forked into two portions. Inside the upper disc-shaped member among the two disc-shaped members of the nut member 843, there is provided elastic object 843*a* which is in a shape of a blade spring and is urged, and the side end portion 838*b* forked into two portions of the second cylindrical lens 838 is interposed tightly without any play between two disc-shaped members of the nut member 843. Therefore, the nut member 843 moves upward or downward when rotary shaft 841 rotates, and accordingly, the side end portion 838*b* of the second cylindrical lens 838 also moves upward or downward.

The worm gear 842 mounted solidly on the rotary shaft 841 is engaged with worm 845 that is connected through gear G1 provided on a motor shaft of motor M that is mounted on scanning optical device main body 831 to be capable of rotating regularly and in the opposite direction and through intermediate gear G2, and when the motor M rotates, the rotary shaft 841 rotates clockwise or counterclockwise.

Depending on the direction of rotation of the wire winding section 841*b* positioned on the upper portion of the rotatable rotary shaft 841, wire 850 is further wound around the wire winding section 841*b* or unwound, depending on the direction of rotation of the rotary shaft 841, to be moved toward the right side or the left side, because wire 850 wound around the wire winding section 841*b* is stretched by tension spring 851.

In one structure, wire position detecting means 852 that detects movement of wire 850 is provided along the wire 850 to detect the position of movement of the wire 850, and this detection makes it possible to detect a range of movement for which the second cylindrical lens 838 can move, namely, to detect the tolerance limit of the upper limit or the lower limit of a light beam passing through the second cylindrical lens 838.

Figure 26:
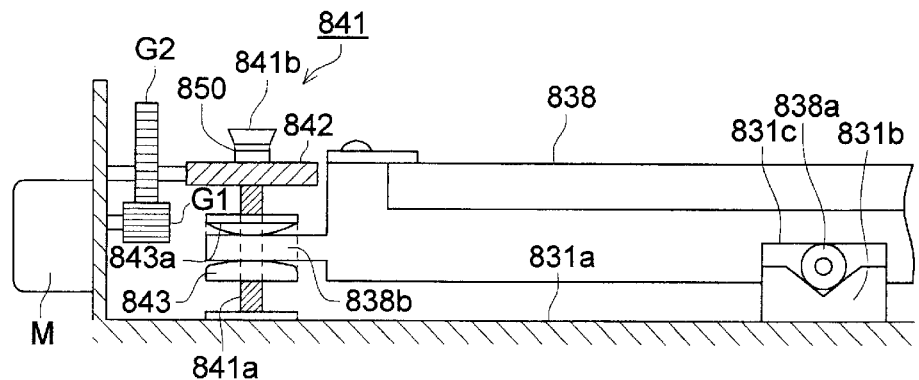
FIG. 26 shows a side view for essential portions, a plan view for essential portions and a sectional side view for essential portions of the invention.
Figure 26:
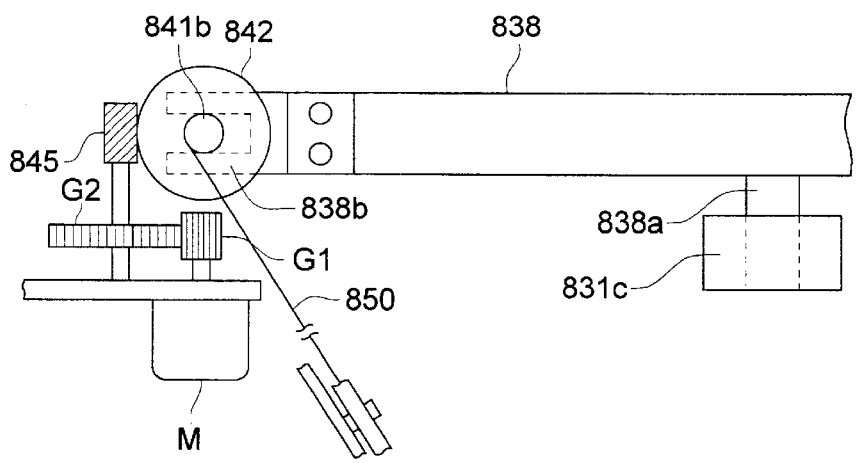
Figure 26:
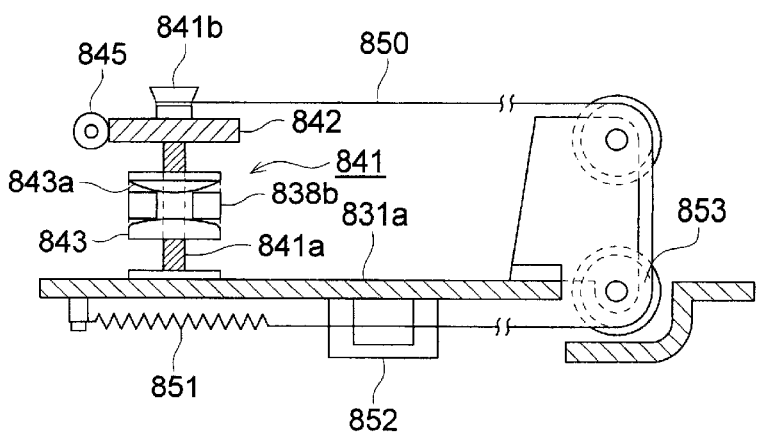

In another structure, as shown in FIG. 26(*c*), there is provided pulley 853 representing a wire direction changing means that changes the direction of wire 850 which is in the state of extension, to lead the wire 850 to the reverse side of base board 831*a*, and wire position detecting means 852 is provided on the reverse side of base board 831*a* where no optical element of the scanning optical device is provided, to utilize a space effectively and to downsize an apparatus.

The wire position detecting means 852 that detects a range of movement allowed for the wire 850 will be explained. As illustrations in FIG. 27 show, the wire position detecting means 852 includes a detecting method of detection by an optical detector, a detecting method of detection by a mechanical switch and a detecting method of detection by conductive detecting.

Figure 27:
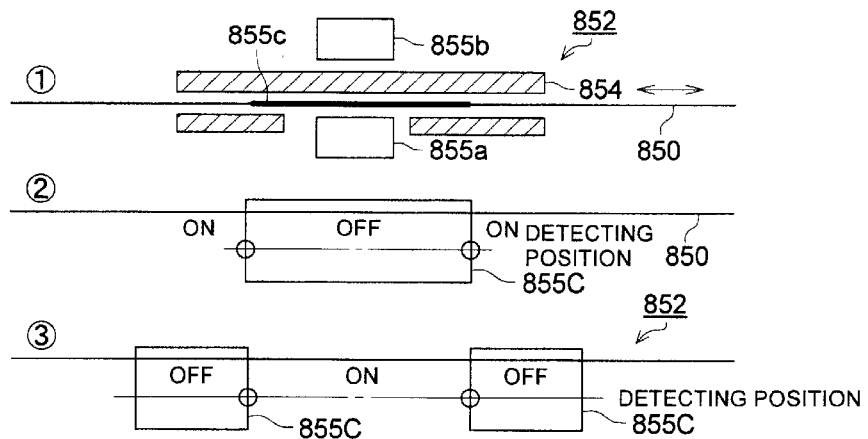
FIG. 27 shows sectional side views showing examples of detecting wire positions.
Figure 27:
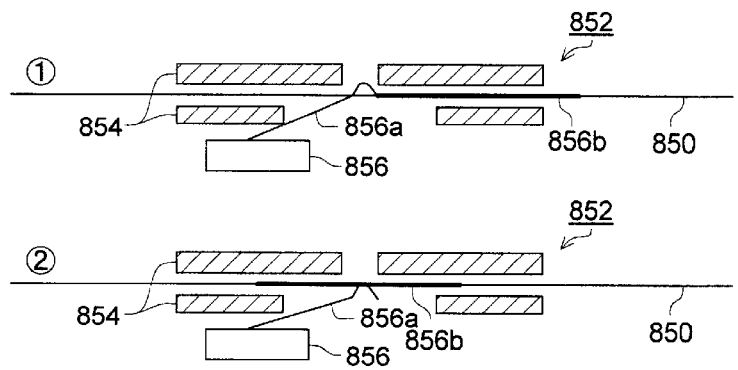
Figure 27:
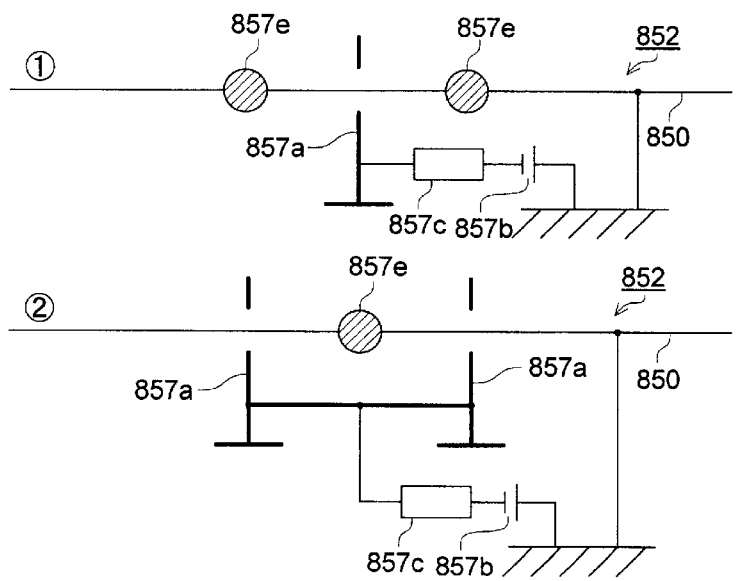

FIG. 27(*a*) is wire position detecting means 852 employing an optical detector, in which light-emitting element 855*a* and light-receiving element 855*b* are provided to face each other with wire 850 between as shown in (1), and when light shielding laminar member 855*c* which is fixed on the wire 850 is present newly between the light-emitting element 855*a* and light-receiving element 855*b*, light emitted from the light-emitting element 855*a* is prevented from arriving at the light-receiving element 855*b*, thus, light detection from ON to OFF is carried out. The numeral 854 represents guide members provided to interpose the wire 850, and when laminar member 855*c* exists, the guide members 854 guide the laminar member 855*c* to be between the light-emitting element 855*a* and the light-receiving element 855*b*. Incidentally, with regard to the light shielding laminar member 855*c*, it may be a single laminar member having a length equivalent to that of movement allowed for wire 850 as shown in (2), or, a distance between two laminar members 855*c* may be arranged to be the same as the length of movement allowed for wire 850 as shown in (3).

FIG. 27(b) is wire position detecting means 852 employing a mechanical switch, in which the state shown in (1) turns out to be the state shown in (2) when actuator 856a of microswitch 856 touches laminar member 856b, and light detection from OFF to ON is carried out. With regard to a method to detect the length of movement allowed for wire 850 in this case again, either a method based on a single sheet of fixed member 856b having the length of movement allowed (See FIG. 27(a) (2)), or a method based on two fixed members 856b wherein a distance between them is arranged to be the same as the length of movement allowed (See FIG. 27(a) (3)) is practicable.

FIG. 27(c) is wire position detecting means 852 employing a method to detect the state of electric continuity, in which a conductive ball representing fixed member 857e is fixed on conductive wire 850 which is grounded. On the apparatus main body side, on the other hand, there is provided laminar detecting member 857a on which a circular detecting hole that conducts when the fixed member 857e arrives is provided. To the detecting member 857a, there are connected small power supply 857b and continuity detecting means 857c, and thereby, it is detected that the wire 850 has come to the limit of its movement allowed. The symbol (1) shows an example wherein two fixed members 857e are fixed on the wire 850 to be away each other by an amount of the limit for movement allowed for the wire so that the detection may be carried out, while, (2) shows an example wherein two sets of detecting members 857a are fixed to be away each other by the amount of movement allowed for the wire 850 so that the detection may be carried out.

By virtue of the wire position detecting means explained above, it is detected that the wire has come to the limit of its movement allowed. When the control section is constructed to control to stop the drive of motor M based on its detection information, a light beam that conducts optical scanning on a photoreceptor can be adjusted within a range which does not deviate from the allowed range of change.

Regarding an adjustment of variation in magnification in the direction of scanning line, an example of the invention will be explained using FIGS. 25(a), 25(b) and 25(c).

With regard to positioning of the scanning optical device on the image forming apparatus, pins 863a and 863b protruded from frame 861 of the image forming apparatus are inserted in the scanning optical device. A round hole is formed on a casing of the scanning optical device at the position thereon corresponding to the pin 863a, while an elongated hole is formed with its major axis being in parallel with the primary scanning direction on the same casing of the scanning optical device at the position thereon corresponding to the pin 863b. Further, the rear end portion of the scanning optical device is supported on adjustment screw 864 protruded from frame 862 of the image forming apparatus. Pressing member 867 presses on the rear end of the scanning optical device in the horizontal and vertical directions. In the horizontal direction, the scanning optical device is positioned by pins 865a and 865b which are protruded from the scanning optical device and come in contact respectively with frame 861 and wedge-formed plate 866 provided on the frame 861.

The wedge-formed plate 866 is a rotatable member whose thickness on a certain section perpendicular to the rotation direction of the member varies gradually as the section moves in the rotation direction of the member, and when the member rotates, a portion of the scanning optical device closer to the pin 865b that is in contact with the wedge-formed plate can rotate relatively to the frame 861, by an amount of a play of the round hole formed on the casing of the scanning optical device, on the center of rotation represented by the position where the pin 865a is in contact with the frame 861. The rotation makes it possible to change a distance between the surface to be scanned in a scanning plane and the scanning optical device, and thereby, variation of parallelism between an image carrier and the scanning optical device caused by size variations of constituent parts of the image forming apparatus can be corrected, resulting in a possibility to correct variance of magnification in the primary scanning direction. After an amount of error is measured automatically or visually by the chart for detecting the magnification error, the wedge-formed plate 866 is rotated up to the desired value manually or automatically so that the correction may be made.

An amount of protrusion from the scanning optical device for each of the pins 865a and 865b may be fixed. However, if the amount of protrusion is arranged to be adjusted by a screw or the like, it is possible to previously adjust, in the course of assembly of the scanning optical device, variations of magnification in the primary scanning direction caused by variations of each part of the scanning optical device for the ideal position corresponding to the frame of the image forming apparatus, for example, variations of a focal length of the lens and variations of the casing of the scanning optical device. When the scanning optical device adjusted accurately to the reference point for mounting is mounted on the image forming apparatus, the wedge-formed plate 866 has only to be operated for positional variations of an image carrier for the reference point of mounting for the scanning optical device in the image forming apparatus, thus, an adjustment margin can be made small, and an adjustment means can be made small in size. It is further possible to make an amount of a play between the pin 863a and the hole that is formed on the casing of the scanning optical device so that the pin 863a may be inserted thereinto to be small, and to provide an image forming apparatus which is highly reliable. Incidentally, correction of the total magnification and that of the writing timing are conducted by a known electrical correction means.

In Embodiments 6, 7 and 8, the following effect can be attained:

A limited position allowed for a light beam emitted and deflected is detected by a single sensor, which simplifies a necessary apparatus.

A limited position allowed for a light beam emitted and deflected is detected without providing a sensor for that purpose, which further simplifies a necessary apparatus.

In the Embodiments, since information about movement of an optical element conducting correction of a position of a scanning line is converted into a movement of a wire, a wire position detecting means can be arranged at the corner portion of the apparatus which is away from the optical element, which makes an apparatus to be small in size.

In Embodiment 8, a wire is lead to the rear side of an apparatus, and a position for a wire position detecting means to be arranged can be selected freely, which further makes an apparatus to be small in size.

Further in Embodiment 8, the adjustment of the variation in the magnification can be made easy by rotation of the wedge member.

What is claimed is:

1. An image forming apparatus, comprising:
   a photoreceptor having an image carrying surface;
   an exposing device to imagewise expose the image carrying surface to form a latent image; and a developing device to develop the latent image to form a toner image on the image carrying surface;

the exposing device comprising:

a light source to emit a light beam;

a deflector to deflect the light beam so as to form a scanning line with the light beam on the image carrying surface;

a cylindrical lens provided between the deflector and the image carrying surface and to focus the light beam on the image carrying surface; and an adjusting mechanism to adjust an inclination of the scanning line and to adjust variance in magnification of an image on the scanning line, wherein the exposing device comprises a unit housing in which the light source, the deflector, and the cylindrical lens are mounted, and wherein the adjusting mechanism comprises first, second and third supporting members to support three different supporting points of the unit housing, a first adjusting member and a second adjusting member, and the adjusting mechanism adjusts the inclination of the scanning line by moving the first adjusting member and adjusts the variance in magnification by moving the second adjusting member.

2. The image forming apparatus of claim 1, wherein a movement of the first supporting point is conducted around a straight line passing through the other two supporting points which serves as an axis, and at least one of the other two supporting points can move in the almost perpendicular direction of the movement direction of the first supporting point.

3. The image forming apparatus of claim 1, wherein a movement of the second supporting point is a rotation around the first supporting point, and the second supporting member is provided with a slide which makes the exposure unit movable in the direction of a normal line of the rotation direction of the second supporting point.

4. The image forming apparatus of claim 1, wherein the third supporting point is fixed.

5. The image forming apparatus of claim 4, wherein the third supporting point is provided on a plane that is almost perpendicular to a scanning plane of the light beam and includes an optical axis of the exposing device.

6. The image forming apparatus of claim 4, wherein the first supporting point and the second supporting point are provided respectively on both end portions of an optical path in a scanning plane.

7. The image forming apparatus of claim 6, wherein the first supporting point and the second supporting point are provided respectively at positions that are almost symmetrical about an optical axis of the exposing device.

8. The image forming apparatus of claim 1, wherein the first supporting member comprises a driving screw and an engagement plate that engages with the driving screw, and the first adjustment member comprises the driving screw, the engagement plate and a driving source that drives the driving screw.

9. The image forming apparatus of claim 1, wherein the second supporting member comprises a driving screw and an engagement plate that engages with the driving screw, and the second adjustment member comprises the driving screw, the engagement plate and a driving source that drives the driving screw.

10. An image forming apparatus, comprising:

a photoreceptor having an image carrying surface;

an exposing device to imagewise expose the image carrying surface to form a latent image; and a developing device to develop the latent image to form a toner image on the image carrying surface;

the exposing device comprising:

a light source to emit a light beam;

a deflector to deflect the light beam so as to form a scanning line with the light beam on the image carrying surface;

a cylindrical lens provided between the deflector and the image carrying surface and to focus the light beam on the image carrying surface; and an adjusting mechanism to adjust an inclination of the scanning line and to adjust variance in magnification of an image on the scanning line, wherein the exposing device comprises a unit housing in which the light source, the deflector, and the cylindrical lens are mounted, and wherein the adjusting mechanism comprises a first adjuster to adjust an inclination of the cylindrical lens so as to adjust the inclination of the scanning line and a second adjuster to shift the unit housing so as to adjust the variance in magnification.

11. The image forming apparatus of claim 10, wherein the first adjuster comprises:

a rotatable member to adjust the inclination of the cylindrical lens by rotation of the rotatable member;

a wire, which is stretched with a spring, extended around the rotatable member; and a position sensor to detect displacement of the wire.

12. The image forming apparatus of claim 10, wherein the second adjuster comprises:

a first pin provided at one end portion of the unit housing in the scanning line to contact a portion in a main body of the image forming apparatus;

a second pin provided at the other end portion of the unit housing in the scanning line to contact a rotatable wedge member which is provided on the main body; and a pressing member provided on the main body to press a far end portion of the unit housing from the image carrying surface of the photoreceptor;

wherein rotation of the wedge member shifts the unit housing to adjust the variance in the magnification.

13. The image forming apparatus of claim 10, further comprises a light beam detector to detect a light beam at an upper limit position and lower limit position.

14. The image forming apparatus of claim 13, wherein the light beam detector also works as a light beam synchronizing detector to detect the light beam for synchronizing the scanning line.

* * * * *